US012468926B2

(12) United States Patent
Mills

(10) Patent No.: US 12,468,926 B2
(45) Date of Patent: Nov. 11, 2025

(54) CIRCULAR BUFFERING IN NEURAL NETWORK PROCESSOR

(71) Applicant: Apple Inc., Cupertino, CA (US)

(72) Inventor: Christopher L. Mills, Saratoga, CA (US)

(73) Assignee: APPLE INC., Cupertino, CA (US)

( * ) Notice: Subject to any disclaimer, the term of this patent is extended or adjusted under 35 U.S.C. 154(b) by 1100 days.

(21) Appl. No.: 17/344,900

(22) Filed: Jun. 10, 2021

(65) Prior Publication Data

US 2022/0398440 A1   Dec. 15, 2022

(51) Int. Cl.
*G06F 13/14* (2006.01)
*G06F 13/16* (2006.01)
*G06N 3/063* (2023.01)

(52) U.S. Cl.
CPC ......... *G06N 3/063* (2013.01); *G06F 13/1673* (2013.01)

(58) Field of Classification Search
CPC ............................ G06N 3/063; G06F 13/1673
See application file for complete search history.

(56) References Cited

U.S. PATENT DOCUMENTS

| | | | | |
|---|---|---|---|---|
| 6,507,921 B1 * | 1/2003 | Buser | ................. | G06F 9/30149 714/45 |
| 6,658,578 B1 * | 12/2003 | Laurenti | ............... | G06F 9/3856 712/E9.032 |
| 6,785,862 B1 * | 8/2004 | Zhang | ............... | H03M 13/2782 714/788 |
| 6,954,721 B2 * | 10/2005 | Webber | .................... | G06F 17/15 375/343 |
| 7,447,722 B2 * | 11/2008 | McGrath | ................. | G06F 17/15 708/300 |
| 7,937,346 B2 * | 5/2011 | Kato | ........................ | G06N 3/08 706/26 |
| 8,423,675 B2 * | 4/2013 | Roberts | ................. | H04L 67/565 709/248 |
| 8,446,300 B2 * | 5/2013 | Reinhardt | ............ | H04L 1/0066 341/51 |

(Continued)

FOREIGN PATENT DOCUMENTS

| | | | |
|---|---|---|---|
| WO | WO 2010/043401 A2 | 4/2010 | |
| WO | WO-2017045522 A1 * | 3/2017 | ............... H04L 1/00 |
| WO | WO 2018/193352 A1 | 10/2018 | |

*Primary Examiner* — Cheng Yuan Tseng
(74) *Attorney, Agent, or Firm* — Sterne, Kessler, Goldstein & Fox P.L.L.C.

(57) ABSTRACT

Embodiments of the present disclosure relate to circular buffers in a neural processor circuit. The neural processor circuit includes multiple neural engine circuits and a data processor circuit coupled to at least one of the neural engine circuits. The at least one neural engine circuit performs at least convolution operations. The data processor circuit includes a circular buffer, and a flow control circuit coupled to the circular buffer. The flow control circuit generates at least one addressing parameter that defines wrapping of data in the circular buffer. The circular buffer controls data flow in the neural processor circuit by storing first data associated with the at least one neural engine circuit so that the first data is wrapped around in the circular buffer. An addressing layout of the first data wrapped around in the circular buffer is defined by the at least one addressing parameter.

20 Claims, 10 Drawing Sheets

(56) References Cited

U.S. PATENT DOCUMENTS

| | | | | |
|---|---|---|---|---|
| 8,755,343 | B2* | 6/2014 | Han | H04W 52/325 |
| | | | | 370/329 |
| 9,143,346 | B1* | 9/2015 | Akhter | H04L 12/6418 |
| 10,387,319 | B2 | 8/2019 | Adler et al. | |
| 11,244,027 | B2* | 2/2022 | Kim | G06N 3/045 |
| 11,301,753 | B2* | 4/2022 | Linares-Barranco | |
| | | | | G06N 3/088 |
| 11,423,296 | B2* | 8/2022 | Bichler | G06N 3/045 |
| 11,475,101 | B2* | 10/2022 | Catthoor | G06N 3/04 |
| 11,663,008 | B2* | 5/2023 | Lee | G06F 15/7821 |
| | | | | 712/208 |
| 11,669,725 | B1* | 6/2023 | Raja | G06N 3/045 |
| | | | | 706/25 |
| 11,699,067 | B2* | 7/2023 | Yachide | G06N 3/04 |
| | | | | 706/15 |
| 11,925,173 | B2* | 3/2024 | Rishi | A01K 61/60 |
| 12,154,026 | B2* | 11/2024 | Lu | G06F 9/5027 |
| 12,175,299 | B2* | 12/2024 | Jo | G06F 9/5055 |
| 2017/0331881 | A1* | 11/2017 | Chandramouli | G06F 16/24568 |
| 2019/0278707 | A1* | 9/2019 | Li | G06F 12/0646 |
| 2020/0285950 | A1 | 9/2020 | Baum et al. | |
| 2021/0026597 | A1* | 1/2021 | Ghotgalkar | G06F 3/0656 |
| 2021/0303978 | A1* | 9/2021 | Nagarajan | G06N 3/084 |
| 2022/0083390 | A1* | 3/2022 | Jo | G06N 3/063 |
| 2022/0327101 | A1* | 10/2022 | Pool | G06N 3/082 |

\* cited by examiner

CIRCULAR BUFFERING IN NEURAL NETWORK PROCESSOR

BACKGROUND

1. Field of the Disclosure

The present disclosure relates to a circuit for performing operations related to neural networks, and more specifically to a circuit that uses circular buffering in a neural network processor.

2. Description of the Related Arts

An artificial neural network (ANN) is a computing system or model that uses a collection of connected nodes to process input data. The ANN is typically organized into layers where different layers perform different types of transformation on their input. Extensions or variants of ANN such as convolution neural network (CNN), recurrent neural networks (RNN) and deep belief networks (DBN) have come to receive much attention. These computing systems or models often involve extensive computing operations including multiplication and accumulation. For example, CNN is a class of machine learning technique that primarily uses convolution between input data and kernel data, which can be decomposed into multiplication and accumulation operations.

Depending on the types of input data and operations to be performed, these machine learning systems or models can be configured differently. Such varying configuration would include, for example, pre-processing operations, the number of channels in input data, kernel data to be used, non-linear function to be applied to convolution result, and applying of various post-processing operations. Using a central processing unit (CPU) and its main memory to instantiate and execute machine learning systems or models of various configuration is relatively easy because such systems or models can be instantiated with mere updates to code. However, relying solely on the CPU for various operations of these machine learning systems or models would consume significant bandwidth of the CPU as well as increase the overall power consumption.

SUMMARY

Embodiments relate to circular buffering in a neural processor circuit where data is wrapped around. The neural processor circuit includes multiple neural engine circuits and a data processor circuit coupled to at least one of the neural engine circuits. The at least one neural engine circuit performs at least convolution operations. The data processor circuit includes a circular buffer, and a flow control circuit coupled to the circular buffer. The flow control circuit generates at least one addressing parameter that defines wrapping of data in the circular buffer. The circular buffer controls data flow in the neural processor circuit by storing first data associated with the at least one neural engine circuit so that the first data is wrapped around in the circular buffer. An addressing layout of the first data wrapped around in the circular buffer is defined by the at least one addressing parameter.

Embodiments further relate to circular buffering in a memory access operation circuit coupled to a system memory external to the neural processor circuit. The memory access operation circuit includes another circular buffer. The flow control circuit generates one or more addressing parameters that define wrapping of data in the other circular buffer. The other circular buffer controls data flow between the neural processor circuit and the system memory by storing second data associated with the system memory so that the second data is wrapped around in the other circular buffer. An addressing layout of the second data wrapped around in the other circular buffer is defined by the one or more addressing parameters.

Figure 1:
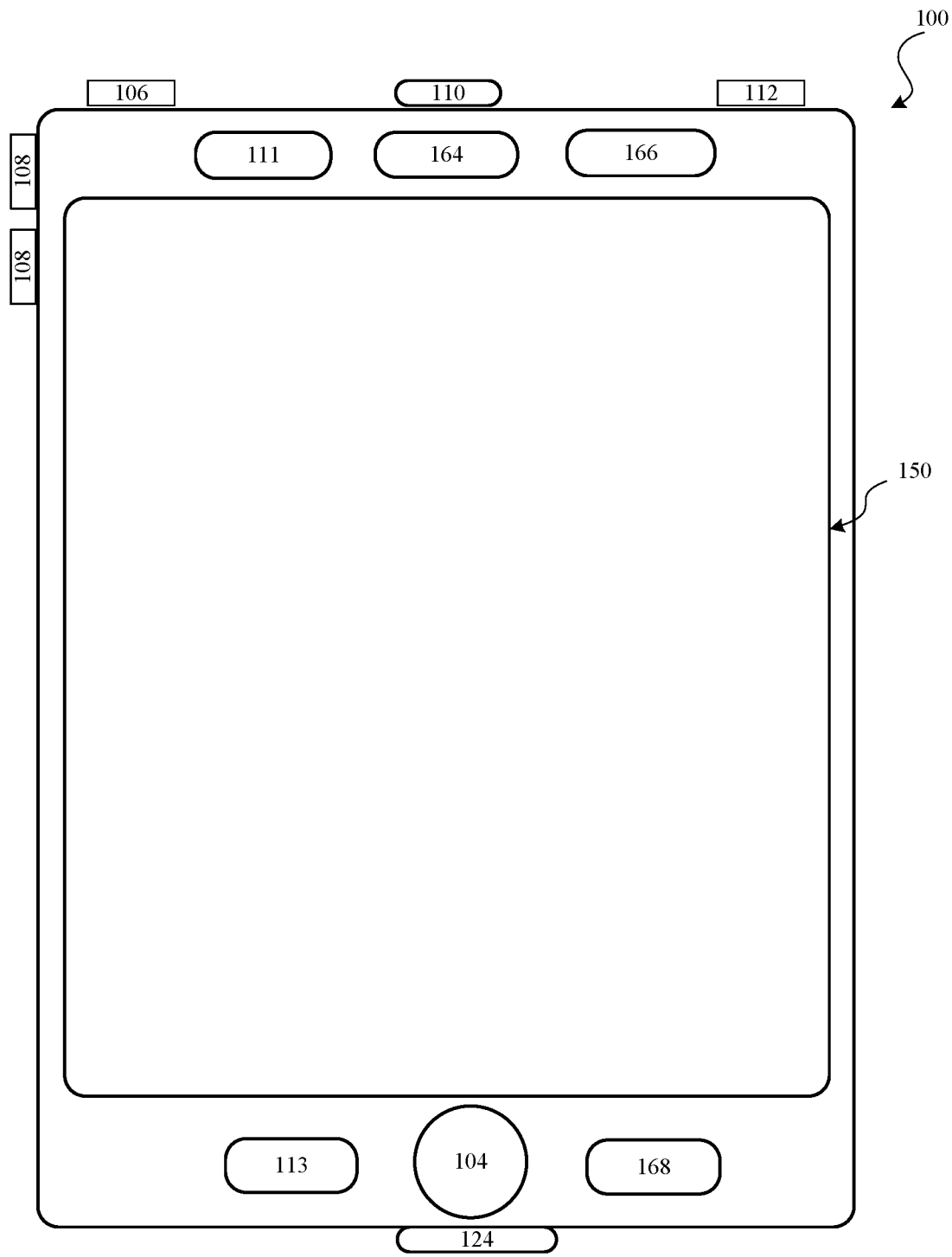
FIG. 1 is a high-level diagram of an electronic device, according to one embodiment.

The figures depict, and the detail description describes, various non-limiting embodiments for purposes of illustration only.

DETAILED DESCRIPTION

Reference will now be made in detail to embodiments, examples of which are illustrated in the accompanying drawings. In the following detailed description, numerous specific details are set forth in order to provide a thorough understanding of the various described embodiments. However, the described embodiments may be practiced without these specific details. In other instances, well-known methods, procedures, components, circuits, and networks have not been described in detail so as not to unnecessarily obscure aspects of the embodiments.

Embodiments of the present disclosure relate to a circular buffering in a neural processor circuit that includes a data processor circuit, multiple neural engine circuits and a planar engine circuit. The circular buffering can be implemented at the data processor circuit using addressing parameters to control flow of data between the neural engine circuits and the planar engine circuit. The addressing parameters define how an addressing layout for a portion of the data stored at the data processor circuit is wrapped around. The circular buffering allows windowing of a larger tensor without unnecessary copying or re-computation of overlapping regions. The circular buffering can also be implemented at a memory access operation circuit that controls data flow between the neural processor circuit and a system memory external to the neural processor circuit.

The circular buffering described herein refers to wrapping addresses of memory space in a circular manner.

A producer described herein refers to a circuit of the neural processor circuit that performs operations on input data during performance of a task to produce output data. For example, the producer can be at least one neural engine circuit or a planar engine circuit. The task performed by the producer is referred to as a producer task herein.

A consumer described herein refers to a circuit of the neural processor circuit that consumes output data produced by the producer during performance of its task to produce its output data. Thus, the task of the consumer is data dependent on the task of the producer. The task performed by the consumer is referred to as a consumer task herein.

Exemplary Electronic Device

Embodiments of electronic devices, user interfaces for such devices, and associated processes for using such devices are described. In some embodiments, the device is a portable communications device, such as a mobile telephone, that also contains other functions, such as personal digital assistant (PDA) and/or music player functions. Exemplary embodiments of portable multifunction devices include, without limitation, the iPhone®, iPod Touch®, Apple Watch®, and iPad® devices from Apple Inc. of Cupertino, California. Other portable electronic devices, such as wearables, laptops or tablet computers, are optionally used. In some embodiments, the device is not a portable communication device, but is a desktop computer or other computing device that is not designed for portable use. In some embodiments, the disclosed electronic device may include a touch-sensitive surface (e.g., a touch screen display and/or a touchpad). An example electronic device described below in conjunction with FIG. 1 (e.g., device 100) may include a touch-sensitive surface for receiving user input. The electronic device may also include one or more other physical user-interface devices, such as a physical keyboard, a mouse and/or a joystick.

FIG. 1 is a high-level diagram of an electronic device 100, according to one embodiment. Device 100 may include one or more physical buttons, such as a "home" or menu button 104. Menu button 104 is, for example, used to navigate to any application in a set of applications that are executed on device 100. In some embodiments, menu button 104 includes a fingerprint sensor that identifies a fingerprint on menu button 104. The fingerprint sensor may be used to determine whether a finger on menu button 104 has a fingerprint that matches a fingerprint stored for unlocking device 100. Alternatively, in some embodiments, menu button 104 is implemented as a soft key in a graphical user interface (GUI) displayed on a touch screen.

In some embodiments, device 100 includes touch screen 150, menu button 104, push button 106 for powering the device on/off and locking the device, volume adjustment buttons 108, Subscriber Identity Module (SIM) card slot 110, headset jack 112, and docking/charging external port 124. Push button 106 may be used to turn the power on/off on the device by depressing the button and holding the button in the depressed state for a predefined time interval; to lock the device by depressing the button and releasing the button before the predefined time interval has elapsed; and/or to unlock the device or initiate an unlock process. In an alternative embodiment, device 100 also accepts verbal input for activation or deactivation of some functions through microphone 113. Device 100 includes various components including, but not limited to, a memory (which may include one or more computer readable storage mediums), a memory controller, one or more central processing units (CPUs), a peripherals interface, an RF circuitry, an audio circuitry, speaker 111, microphone 113, input/output (I/O) subsystem, and other input or control devices. Device 100 may include one or more image sensors 164, one or more proximity sensors 166, and one or more accelerometers 168. Device 100 may include more than one type of image sensors 164. Each type may include more than one image sensor 164. For example, one type of image sensors 164 may be cameras and another type of image sensors 164 may be infrared sensors for facial recognition that is performed by one or more machine learning models stored in device 100. Device 100 may include components not shown in FIG. 1 such as an ambient light sensor, a dot projector and a flood illuminator that is to support facial recognition.

Device 100 is only one example of an electronic device, and device 100 may have more or fewer components than listed above, some of which may be combined into a component or have a different configuration or arrangement. The various components of device 100 listed above are embodied in hardware, software, firmware or a combination thereof, including one or more signal processing and/or application-specific integrated circuits (ASICs).

Figure 2:
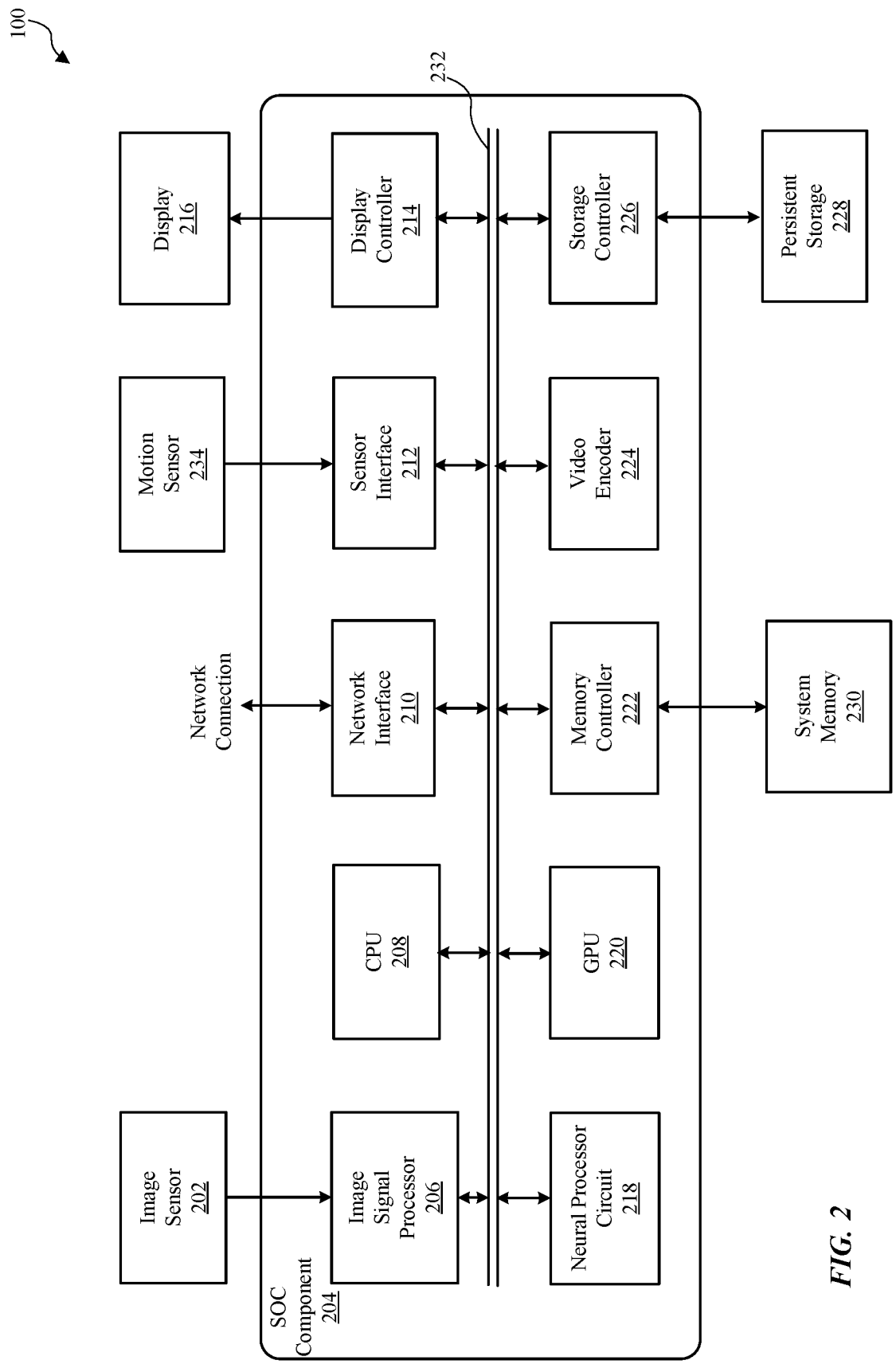
FIG. 2 is a block diagram illustrating components in the electronic device, according to one embodiment.

FIG. 2 is a block diagram illustrating components in device 100, according to one embodiment. Device 100 may perform various operations including implementing one or more machine learning models. For this and other purposes, device 100 may include, among other components, image sensors 202, a system-on-a chip (SOC) component 204, a system memory 230, a persistent storage (e.g., flash memory) 228, a motion sensor 234, and a display 216. The components as illustrated in FIG. 2 are merely illustrative. For example, device 100 may include other components (such as speaker or microphone) that are not illustrated in FIG. 2. Further, some components (such as motion sensor 234) may be omitted from device 100.

An image sensor 202 is a component for capturing image data and may be embodied, for example, as a complementary metal-oxide-semiconductor (CMOS) active-pixel sensor) a camera, video camera, or other devices. Image sensor 202 generates raw image data that is sent to SOC component 204 for further processing. In some embodiments, the image data processed by SOC component 204 is displayed on display 216, stored in system memory 230, persistent storage 228 or sent to a remote computing device via network connection. The raw image data generated by image sensor 202 may be in a Bayer color kernel array (CFA) pattern.

Motion sensor 234 is a component or a set of components for sensing motion of device 100. Motion sensor 234 may generate sensor signals indicative of orientation and/or acceleration of device 100. The sensor signals are sent to SOC component 204 for various operations such as turning on device 100 or rotating images displayed on display 216.

Display 216 is a component for displaying images as generated by SOC component 204. Display 216 may include, for example, liquid crystal display (LCD) device or an organic light-emitting diode (OLED) device. Based on data received from SOC component 204, display 116 may display various images, such as menus, selected operating parameters, images captured by image sensor 202 and processed by SOC component 204, and/or other information received from a user interface of device 100 (not shown).

System memory 230 is a component for storing instructions for execution by SOC component 204 and for storing data processed by SOC component 204. System memory 230 may be embodied as any type of memory including, for example, dynamic random access memory (DRAM), synchronous DRAM (SDRAM), double data rate (DDR, DDR2, DDR3, etc.) RAMBUS DRAM (RDRAM), static RAM (SRAM) or a combination thereof.

Persistent storage 228 is a component for storing data in a non-volatile manner. Persistent storage 228 retains data even when power is not available. Persistent storage 228 may be embodied as read-only memory (ROM), flash memory or other non-volatile random access memory devices. Persistent storage 228 stores an operating system of device 100 and various software applications. Persistent storage 228 may also store one or more machine learning models, such as regression models, random forest models, support vector machines (SVMs) such as kernel SVMs, and artificial neural networks (ANNs) such as convolutional network networks (CNNs), recurrent network networks (RNNs), autoencoders, and long short term memory (LSTM). A machine learning model may be an independent model that works with the neural processor circuit 218 and various software applications or sensors of device 100. A machine learning model may also be part of a software application. The machine learning models may perform various tasks such as facial recognition, image classification, object, concept, and information classification, speech recognition, machine translation, voice recognition, voice command recognition, text recognition, text and context analysis, other natural language processing, predictions, and recommendations.

Various machine learning models stored in device 100 may be fully trained, untrained, or partially trained to allow device 100 to reinforce or continue to train the machine learning models as device 100 is used. Operations of the machine learning models include various computation used in training the models and determining results in runtime using the models. For example, in one case, device 100 captures facial images of the user and uses the images to continue to improve a machine learning model that is used to lock or unlock the device 100.

SOC component 204 is embodied as one or more integrated circuit (IC) chip and performs various data processing processes. SOC component 204 may include, among other subcomponents, image signal processor (ISP) 206, a central processor unit (CPU) 208, a network interface 210, sensor interface 212, display controller 214, neural processor circuit 218, graphics processor (GPU) 220, memory controller 222, video encoder 224, storage controller 226, and bus 232 connecting these subcomponents. SOC component 204 may include more or fewer subcomponents than those shown in FIG. 2.

ISP 206 is a circuit that performs various stages of an image processing pipeline. In some embodiments, ISP 206 may receive raw image data from image sensor 202, and process the raw image data into a form that is usable by other subcomponents of SOC component 204 or components of device 100. ISP 206 may perform various image-manipulation operations such as image translation operations, horizontal and vertical scaling, color space conversion and/or image stabilization transformations.

CPU 208 may be embodied using any suitable instruction set architecture, and may be configured to execute instructions defined in that instruction set architecture. CPU 208 may be general-purpose or embedded processors using any of a variety of instruction set architectures (ISAs), such as the x86, PowerPC, SPARC, RISC, ARM or MIPS ISAs, or any other suitable ISA. Although a single CPU is illustrated in FIG. 2, SOC component 204 may include multiple CPUs. In multiprocessor systems, each of the CPUs may commonly, but not necessarily, implement the same ISA.

Graphics processing unit (GPU) 220 is graphics processing circuitry for performing graphical data. For example, GPU 220 may render objects to be displayed into a frame buffer (e.g., one that includes pixel data for an entire frame). GPU 220 may include one or more graphics processors that may execute graphics software to perform a part or all of the graphics operation, or hardware acceleration of certain graphics operations.

Neural processor circuit 218 is a circuit that performs various machine learning operations based on computation including multiplication, addition, and accumulation. Such computation may be arranged to perform, for example, various types of tensor multiplications such as tensor product and convolution of input data and kernel data. Neural processor circuit 218 is a configurable circuit that performs these operations in a fast and power-efficient manner while relieving CPU 208 of resource-intensive operations associated with neural network operations. Neural processor circuit 218 may receive the input data from sensor interface 212, the image signal processor 206, persistent storage 228, system memory 230 or other sources such as network interface 210 or GPU 220. The output of neural processor circuit 218 may be provided to various components of device 100 such as image signal processor 206, system memory 230 or CPU 208 for various operations. The structure and operation of neural processor circuit 218 are described below in detail with reference to FIG. 3.

Network interface 210 is a subcomponent that enables data to be exchanged between devices 100 and other devices via one or more networks (e.g., carrier or agent devices). For example, video or other image data may be received from other devices via network interface 210 and be stored in system memory 230 for subsequent processing (e.g., via a back-end interface to image signal processor 206) and display. The networks may include, but are not limited to, Local Area Networks (LANs) (e.g., an Ethernet or corporate network) and Wide Area Networks (WANs). The image data received via network interface 210 may undergo image processing processes by ISP 206.

Sensor interface 212 is circuitry for interfacing with motion sensor 234. Sensor interface 212 receives sensor information from motion sensor 234 and processes the sensor information to determine the orientation or movement of device 100.

Display controller 214 is circuitry for sending image data to be displayed on display 216. Display controller 214 receives the image data from ISP 206, CPU 208, graphic processor or system memory 230 and processes the image data into a format suitable for display on display 216.

Memory controller 222 is circuitry for communicating with system memory 230. Memory controller 222 may read data from system memory 230 for processing by ISP 206, CPU 208, GPU 220 or other subcomponents of SOC component 204. Memory controller 222 may also write data to system memory 230 received from various subcomponents of SOC component 204.

Video encoder 224 is hardware, software, firmware or a combination thereof for encoding video data into a format suitable for storing in persistent storage 228 or for passing the data to network interface 210 for transmission over a network to another device.

In some embodiments, one or more subcomponents of SOC component 204 or some functionality of these subcomponents may be performed by software components executed on neural processor circuit 218, ISP 206, CPU 208 or GPU 220. Such software components may be stored in system memory 230, persistent storage 228 or another device communicating with device 100 via network interface 210.

Example Neural Processor Circuit

Neural processor circuit 218 is a programmable circuit that performs machine learning operations on the input data of neural processor circuit 218. Machine learning operations may include different computations for training of a machine learning model and for performing inference or prediction based on the trained machine learning model.

Taking an example of a CNN as the machine learning model, training of the CNN may include forward propagation and backpropagation. A neural network may include an input layer, an output layer, and one or more intermediate layers that may be referred to as hidden layers. Each layer may include one or more nodes, which may be fully or partially connected to other nodes in adjacent layers. In forward propagation, the neural network performs computation in the forward direction based on outputs of a preceding layer. The operation of a node may be defined by one or more functions. The functions that define the operation of a node may include various computation operation such as convolution of data with one or more kernels, pooling of layers, tensor multiplication, etc. The functions may also include an activation function that adjusts the weight of the output of the node. Nodes in different layers may be associated with different functions. For example, a CNN may include one or more convolutional layers that are mixed with pooling layers and are followed by one or more fully connected layers.

Each of the functions, including kernels, in a machine learning model may be associated with different coefficients that are adjustable during training. In addition, some of the nodes in a neural network each may also be associated with an activation function that decides the weight of the output of the node in a forward propagation. Common activation functions may include step functions, linear functions, sigmoid functions, hyperbolic tangent functions (tanh), and rectified linear unit functions (ReLU). After a batch of data of training samples passes through a neural network in the forward propagation, the results may be compared to the training labels of the training samples to compute the network's loss function, which represents the performance of the network. In turn, the neural network performs backpropagation by using coordinate descent such as stochastic coordinate descent (SGD) to adjust the coefficients in various functions to improve the value of the loss function.

In training, device 100 may use neural processor circuit 218 to perform all or some of the operations in the forward propagation and backpropagation. Multiple rounds of forward propagation and backpropagation may be performed by neural processor circuit 218, solely or in coordination with other processors such as CPU 208, GPU 220, and ISP 206. Training may be completed when the loss function no longer improves (e.g., the machine learning model has converged) or after a predetermined number of rounds for a particular set of training samples. As device 100 is used, device 100 may continue to collect additional training samples for the neural network.

For prediction or inference, device 100 may receive one or more input samples. Neural processor circuit 218 may take the input samples to perform forward propagation to determine one or more results. The input samples may be images, speeches, text files, sensor data, or other data.

Data and functions (e.g., input data, kernels, functions, layers outputs, gradient data) in machine learning may be saved and represented by one or more tensors. Common operations related to training and runtime of a machine learning model may include tensor product, tensor transpose, tensor elementwise operation, convolution, application of an activation function, automatic differentiation to determine gradient, statistics and aggregation of values in tensors (e.g., average, variance, standard deviation), tensor rank and size manipulation, etc.

While the training and runtime of a neural network is discussed as an example, the neural processor circuit 218 may also be used for the operations of other types of machine learning models, such as a kernel SVM.

Figure 3:
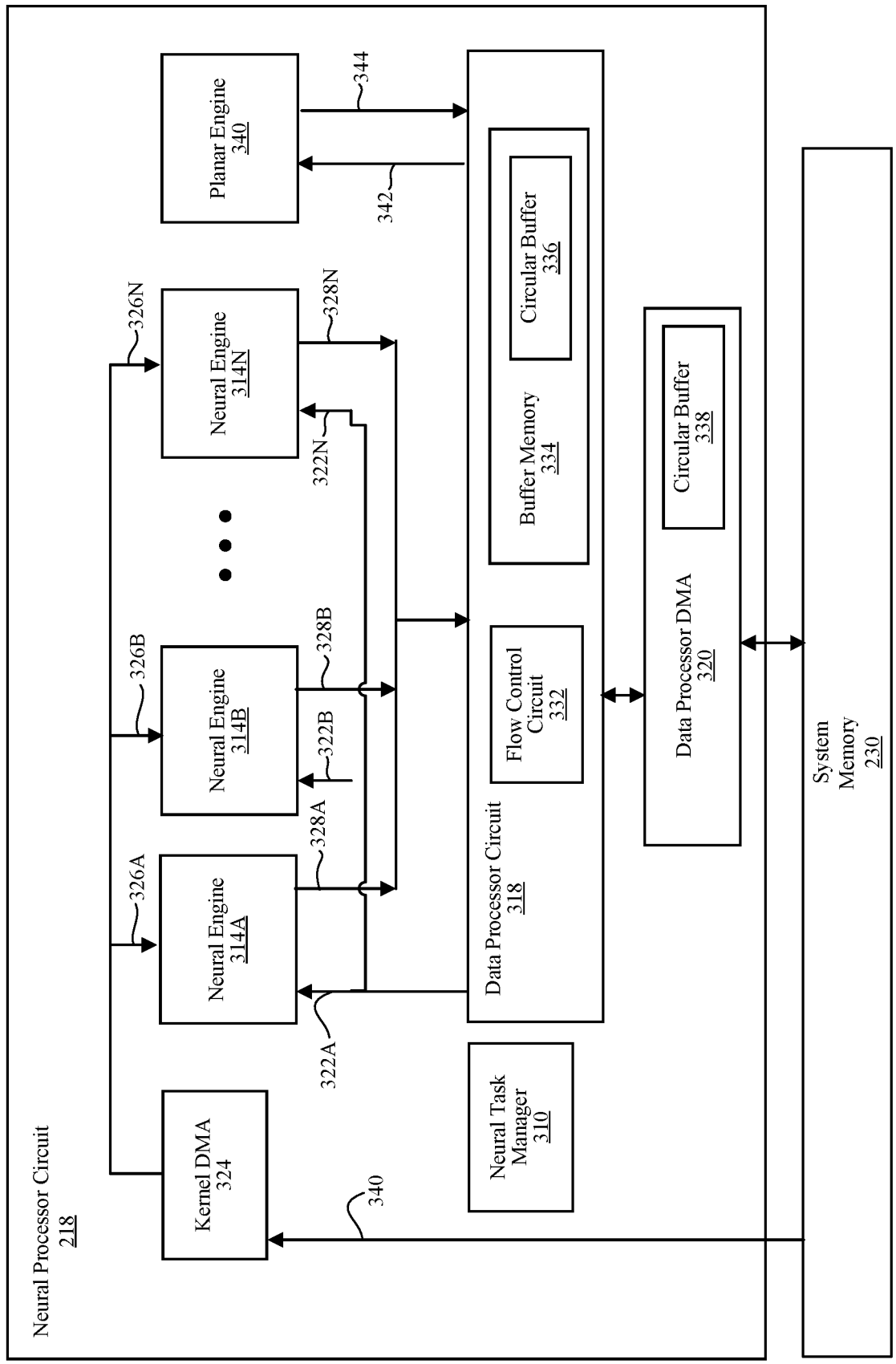
FIG. 3 is a block diagram illustrating a neural processor circuit, according to one embodiment.

Referring to FIG. 3, an example neural processor circuit 218 may include, among other components, neural task manager 310, a plurality of neural engines 314A through 314N (hereinafter collectively referred as "neural engines 314" and individually also referred to as "neural engine 314"), kernel direct memory access (DMA) 324, data processor circuit 318, data processor DMA 320, and planar engine 340. Neural processor circuit 218 may include fewer or additional components not illustrated in FIG. 3.

Each of neural engines 314 performs computing operations for machine learning in parallel. Depending on the load of operation, the entire set of neural engines 314 may be operating or only a subset of the neural engines 314 may be operating while the remaining neural engines 314 are placed in a power-saving mode to conserve power. Each of neural engines 314 includes components for storing one or more kernels, for performing multiply-accumulate operations, and for post-processing to generate an output data 328, as described below in detail with reference to FIG. 4. Neural engines 314 may specialize in performing computation heavy operations such as convolution operations and tensor product operations. Convolution operations may include different kinds of convolutions, such as cross-channel convolutions (a convolution that accumulates values from different channels), channel-wise convolutions, and transposed convolutions.

Planar engine 340 may specialize in performing simpler computing operations whose speed may primarily depend on the input and output (I/O) speed of the data transmission instead of the computation speed within planar engine 340. Those computing operations may be referred to as I/O bound computations. In contrast, neural engines 314 may focus on complex computation whose speed may primarily depend on the computation speed within each neural engine 314. For example, planar engine 340 is efficient at performing operations within a single channel while neural engines 314 are efficient at performing operations across multiple channels that may involve heavy accumulation of data. The use of neural engine 314 to compute I/O bound computations may not be efficient in terms of both speed and power consumption. In one embodiment, input data may be a tensor whose rank is larger than three (e.g., having three or more dimensions). A set of dimensions (two or more) in the tensor may be referred to as a plane while another dimension may be referred to as a channel. Neural engines 314 may convolve data of a plane in the tensor with a kernel and accumulate results of the convolution of different planes across different channels. On the other hand, planar engine 340 may specialize in operations within the plane.

The circuitry of planar engine 340 may be programmed for operation in one of multiple modes, including a pooling mode, an elementwise mode, and a reduction mode. In the pooling mode, planar engine 340 reduce a spatial size of input data. In the elementwise mode, planar engine 340 generates an output that is derived from elementwise operations of one or more inputs. In the reduction mode, planar engine 340 reduces the rank of a tensor. For example, a rank 5 tensor may be reduced to a rank 2 tensor, or a rank 3 tensor may be reduced to a rank 0 tensor (e.g., a scalar). The operations of planar engine 340 will be discussed in further detail below with reference to FIG. 5.

Neural task manager 310 manages the overall operation of neural processor circuit 218. Neural task manager 310 may receive a task list from a compiler executed by CPU 208, store tasks in its task queues, choose a task to perform, and send task commands to other components of the neural processor circuit 218 for performing the chosen task. Data may be associated with a task command that indicates the types of operations to be performed on the data. Data of the neural processor circuit 218 includes input data that is transmitted from another source such as system memory 230, and data generated by the neural processor circuit 218 in a previous operation cycle. Each dataset may be associated with a task command that specifies the type of operations to be performed on the data. Neural task manager 310 may also perform switching of tasks on detection of events such as receiving instructions from CPU 208. In one or more embodiments, neural task manager 310 sends rasterizer information to the components of neural processor circuit 218 to enable each of the components to track, retrieve or process appropriate segments of the input data and kernel data. For example, neural task manager 310 may include registers that stores the information regarding the size and rank of a dataset for processing by the neural processor circuit 218. Although neural task manager 310 is illustrated in FIG. 3 as part of neural processor circuit 218, neural task manager 310 may be a component outside the neural processor circuit 218.

Kernel DMA 324 is a read circuit that fetches kernel data from a source (e.g., system memory 230) and sends kernel data 326A through 326N to each of the neural engines 314. Kernel data represents information from which kernel elements can be extracted. In one embodiment, the kernel data may be in a compressed format which is decompressed at each of neural engines 314. Although kernel data provided to each of neural engines 314 may be the same in some instances, the kernel data provided to each of neural engines 314 is different in most instances. In one embodiment, the direct memory access nature of kernel DMA 324 may allow kernel DMA 324 to fetch and write data directly from the source without the involvement of CPU 208.

Data processor circuit 318 manages data traffic and task performance of neural processor circuit 218. Data processor circuit 318 may include a flow control circuit 332 and a buffer memory 334. Buffer memory 334 is temporary storage for storing data associated with operations of neural processor circuit 218 and planar engine 340, such as input data that is transmitted from system memory 230 (e.g., data from a machine learning model) and other data that is generated within neural processor circuit 218 or planar engine 340. The data stored in data processor circuit 318 may include different subsets that are sent to various downstream components, such as neural engines 314 and planar engine 340.

In one embodiment, buffer memory 334 is embodied as a non-transitory memory that can be accessed by neural engines 314 and planar engine 340. Buffer memory 334 may store input data 322A through 322N for feeding to corresponding neural engines 314A through 314N or planar engine 340, as well as output data 328A through 328N from each of neural engines 314A through 314N or planar engine 340 for feeding back into one or more neural engines 314 or planar engine 340, or sending to a target circuit (e.g., system memory 230). Buffer memory 334 may also store input data 342 and output data 344 of planar engine 340 and allow the exchange of data between neural engine 314 and planar engine 340. For example, one or more output data 328A through 328N of neural engines 314 are used as the input 342 to planar engine 340. Likewise, the output 344 of planar engine 340 may be used as the input data 322A through 322N of neural engines 314. The inputs of neural engines 314 or planar engine 340 may be any data stored in buffer memory 334. For example, in various operating cycles, the source datasets from which one of the engines fetches as inputs may be different. The input of an engine may be an output of the same engine in previous cycles, outputs of different engines, or any other suitable source datasets stored in buffer memory 334. Also, a dataset in buffer memory 334 may be divided and sent to different engines for different operations in the next operating cycle. Two datasets in buffer memory 334 may also be joined for the next operation.

In accordance with embodiments of the present disclosure, buffer memory 334 includes a circular buffer 336 that controls data flow in neural processor circuit 218. Circular buffer 336 may store at least some data in memory space with its addressing layout wrapped around. The structure and features of circular buffer 336 will be discussed in detail below with reference to FIGS. 6 through 9.

Flow control circuit 332 of data processor circuit 318 may control the exchange of data between neural engines 314 and planar engine 340. The operations of data processor circuit 318 and other components of neural processor circuit 218 are coordinated so that the input data and intermediate data stored in data processor circuit 318 may be reused across multiple operations at neural engines 314 and planar engine 340, thereby reducing data transfer to and from system memory 230. Flow control circuit 332 may perform one or more of the following operations: (i) monitor the size and rank of data (e.g. data may be one or more tensors) that are being processed by neural engines 314 and planar engine 340, (ii) determine which subsets of data are transmitted to neural engines 314 or to planar engine 340 based on the task commands associated with different subsets of data, (iii) determine the manner in which data is transmitted to neural engines 314 and planar engine 340 (e.g., the data processor circuit 318 may operate in a broadcast mode where the same data is fed to multiple input channels of neural engines 314 so that multiple or all neural engines 314 receive the same data or in a unicast mode where different neural engines 314 receives different data), and (iv) transmit a configuration command to the planar engine 340 to direct planar engine 340 to program itself for operating in one of multiple operation modes. Furthermore, flow control circuit 332 may generate at least one addressing parameter that defines a wrapped-around addressing layout for at least a portion of data stored in circular buffer 336.

The data of neural processor circuit 218 stored in buffer memory 334 may be part of, among others, image data, histogram of oriented gradients (HOG) data, audio data, metadata, output data 328 of a previous cycle of a neural engine 314, and other processed data received from other components of the SOC component 204.

Data processor DMA 320 includes a read circuit that receives a segment of the input data from a source (e.g., system memory 230) for storing in buffer memory 334, and a write circuit that forwards data from buffer memory 334 to a target component (e.g., system memory). In one embodiment, the direct memory access nature of data processor DMA 320 may allow data processor DMA 320 to fetch and write data directly from a source (e.g., system memory 230) without the involvement of CPU 208. Buffer memory 334 may be a direct memory access buffer that stores data of a machine learning model of device 100 without involvement of CPU 208. Data processor DMA 320 may further include a circular buffer 338 that controls data flow between neural processor circuit 218 and system memory 230. Circular buffer 338 may store at least some data with an addressing layout that is wrapped around within circular buffer 338. The operations of circular buffer 338 will be discussed in further detail below with reference to FIG. 10.

Example Neural Engine Architecture

Figure 4:
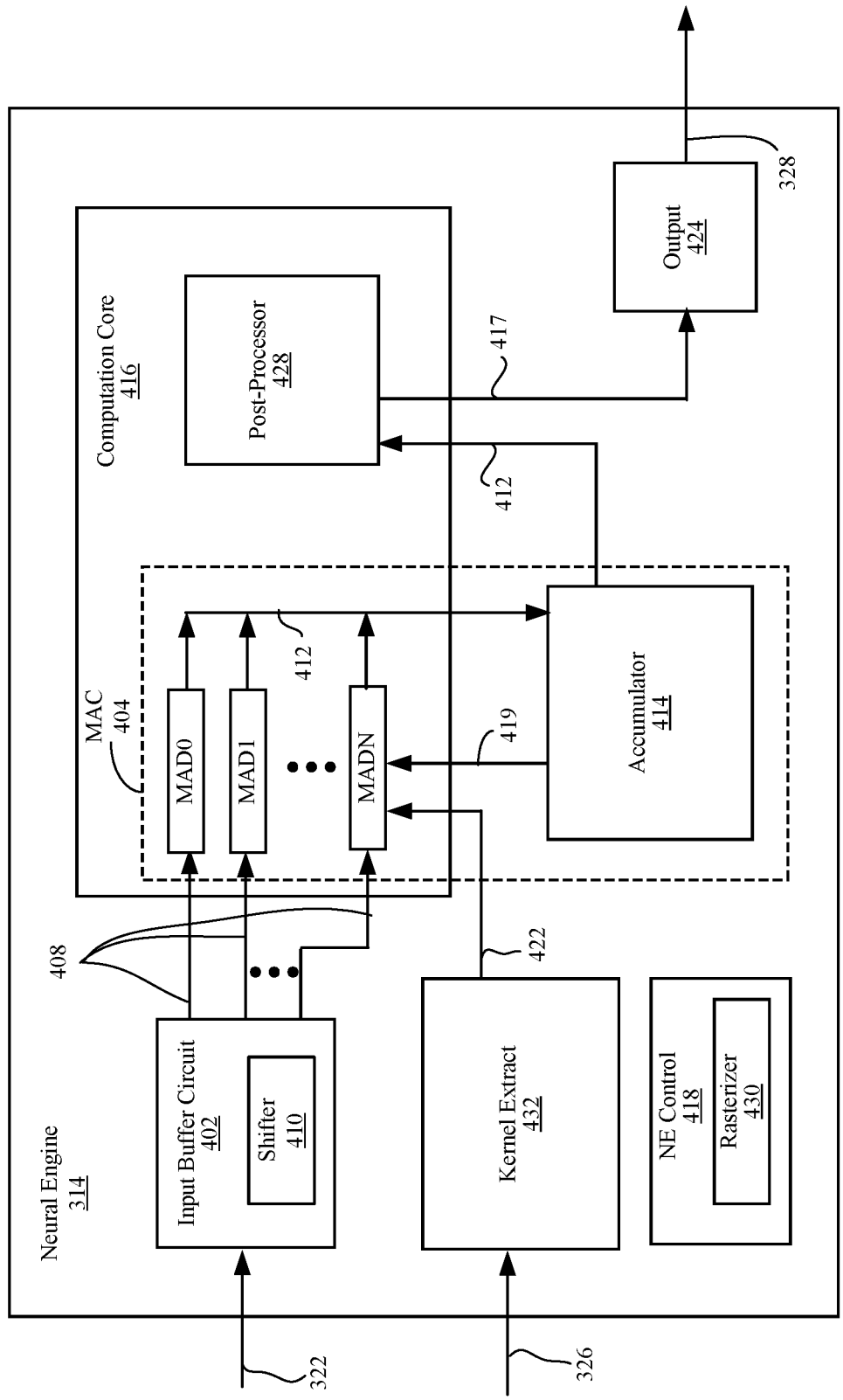
FIG. 4 is a block diagram of a neural engine in the neural processor circuit, according to one embodiment.

FIG. 4 is a block diagram of neural engine 314, according to one embodiment. Neural engine 314 performs various operations to facilitate machine learning such as convolution, tensor product, and other operations may involve heavy computation. For this purpose, neural engine 314 receives input data 322, performs multiply-accumulate operations (e.g., convolution operations) on input data 322 based on stored kernel data, performs further post-processing operations on the result of the multiply-accumulate operations, and generates output data 328. Input data 322 and/or output data 328 of neural engine 314 may be of a single channel or span across multiple channels.

Neural engine 314 may include, among other components, input buffer circuit 402, computation core 416, neural engine (NE) control 418, kernel extract circuit 432, accumulator circuit 414 and output circuit 424. Neural engine 314 may include fewer components than what is illustrated in FIG. 4 or include further components not illustrated in FIG. 4.

Input buffer circuit 402 is a circuit that stores a subset of the data of neural processor circuit 218 as the subset of data is received from a source. The source may be data processor circuit 318, planar engine 340, or another suitable component. Input buffer circuit 402 sends an appropriate segment 408 of data for a current task or process loop to computation core 416 for processing. Input buffer circuit 402 may include a shifter 410 that shifts read locations of input buffer circuit 402 to change segment 408 of data sent to computation core 416. By changing segments of input data provided to computation core 416 via shifting, neural engine 314 can perform multiply-accumulate for different segments of input data based on a fewer number of read operations. In one or more embodiments, the data of neural processor circuit 218 includes data of difference convolution groups and/or input channels.

Kernel extract circuit 432 is a circuit that receives kernel data 326 from kernel DMA 324 and extracts kernel coefficients 422. In one embodiment, kernel extract circuit 432 references a lookup table (LUT) and uses a mask to reconstruct a kernel from compressed kernel data 326 based on the LUT. The mask indicates locations in the reconstructed kernel to be padded with zero and remaining locations to be filled with numbers. Kernel coefficients 422 of the reconstructed kernel are sent to computation core 416 to populate register in multiply-add (MAD) circuits of computation core 416. In other embodiments, kernel extract circuit 432 receives kernel data in an uncompressed format and the kernel coefficients are determined without referencing a LUT or using a mask.

Computation core 416 is a programmable circuit that performs computation operations. For this purpose, computation core 416 may include MAD circuits MAD0 through MADN and a post-processor 428. Each of MAD circuits MAD0 through MADN may store an input value in the segment 408 of the input data and a corresponding kernel coefficient in kernel coefficients 422. The input value and the corresponding kernel coefficient are multiplied in each of MAD circuits to generate a processed value 412.

Accumulator circuit 414 is a memory circuit that receives and stores processed values 412 from MAD circuits. The processed values stored in accumulator circuit 414 may be sent back as feedback information 419 for further multiply and add operations at MAD circuits or sent to post-processor 428 for post-processing. Accumulator circuit 414 in combination with MAD circuits form a multiply-accumulator (MAC) 404. In one or more embodiments, accumulator circuit 414 may have subunits (or batches) where each subunit sends data to different components of neural engine 314. For example, during a processing cycle, data stored in a first subunit of accumulator circuit 414 is sent to the MAC circuit while data stored in a second subunit of accumulator circuit 414 is sent to post-processor 428.

Post-processor 428 is a circuit that performs further processing of values 412 received from accumulator circuit 414. Post-processor 428 may perform operations including, but not limited to, applying linear functions (e.g., Rectified Linear Unit (ReLU)), normalized cross-correlation (NCC), merging the results of performing neural operations on 8-bit data into 16-bit data, and local response normalization (LRN). The result of such operations is output from post-processor 428 as processed values 417 to output circuit 424. In some embodiments, the processing at the post-processor 428 is bypassed. For example, the data in accumulator circuit 414 may be sent directly to output circuit 424 for access by other components of neural processor circuit 218.

NE control 418 controls operations of other components of neural engine 314 based on the operation modes and parameters of neural processor circuit 218. Depending on different modes of operation (e.g., group convolution mode or non-group convolution mode) or parameters (e.g., the number of input channels and the number of output channels), neural engine 314 may operate on different input data in different sequences, return different values from accumulator circuit 414 to MAD circuits, and perform different types of post-processing operations at post-processor 428. To configure components of neural engine 314 to operate in a desired manner, the NE control 418 sends task commands that may be included in information 419 to components of neural engine 314. NE control 418 may include a rasterizer 430 that tracks the current task or process loop being processed at neural engine 314.

Input data is typically split into smaller pieces of data for parallel processing at multiple neural engines 314 or neural engines 314 and planar engine 340. A set of data used for a convolution operation may be referred to as a convolution group, which can be split into multiple smaller units. The hierarchy of smaller units (segments) may be convolution groups, slices, tiles, work units, output channel groups, input channels (Cin), sub-Cins for input stride, etc. For example, a convolution group may be split into several slices; a slice may be split into several tiles; a tile may be split into several work units; and so forth. In the context of neural engine 314, a work unit may be a segment of the input data, such as data processed by planar engine 340 or data processed a prior cycle of neural engines 314 having a size that produces output values that fit into accumulator circuit 414 of neural engine 314 during a single cycle of the computation core 416. In one case, the size of each work unit is 256 bytes. In such embodiments, for example, work units can be shaped to one of 16×16, 32×8, 64×4, 128×2 or 256×1 datasets. In the context of planar engine 340, a work unit may be (i) a segment of input data, (ii) data from neural engine 314 or (iii) data from a prior cycle of planar engine 340 that can be processed simultaneously at planar engine 340.

Rasterizer 430 may perform the operations associated with dividing the input data into smaller units (segments) and regulate the processing of the smaller units through the MACs 404 and accumulator circuit 414. Rasterizer 430 keeps track of sizes and ranks of segments of the input/output data (e.g., groups, work units, input channels, output channels) and instructs the components of a neural processor circuit 218 for proper handling of the segments of the input data. For example, rasterizer 430 operates shifters 410 in input buffer circuits 402 to forward correct segments 408 of input data to MAC 404 and send the finished output data 328 to data buffer memory 334. Other components of neural processor circuit 218 (e.g., kernel DMA 324, buffer DMA 320, buffer memory 334, planar engine 340) may also have their corresponding rasterizers to monitor the division of input data and the parallel computation of various segments of input data in different components.

Output circuit 424 receives processed values 417 from post-processor 428 and interfaces with data processor circuit 318 to store processed values 417 in data processor circuit 318. For this purpose, output circuit 424 may send out as output data 328 in a sequence or a format that is different from the sequence or format in which the processed values 417 are processed in post-processor 428.

The components in neural engine 314 may be configured during a configuration period by NE control 418 and neural task manager 310. For this purpose, neural task manager 310 sends configuration information to neural engine 314 during the configuration period. The configurable parameters and modes may include, but are not limited to, mapping between input data elements and kernel elements, the number of input channels, the number of output channels, performing of output strides, and enabling/selection of post-processing operations at post-processor 428.

Example Planar Engine

Figure 5:
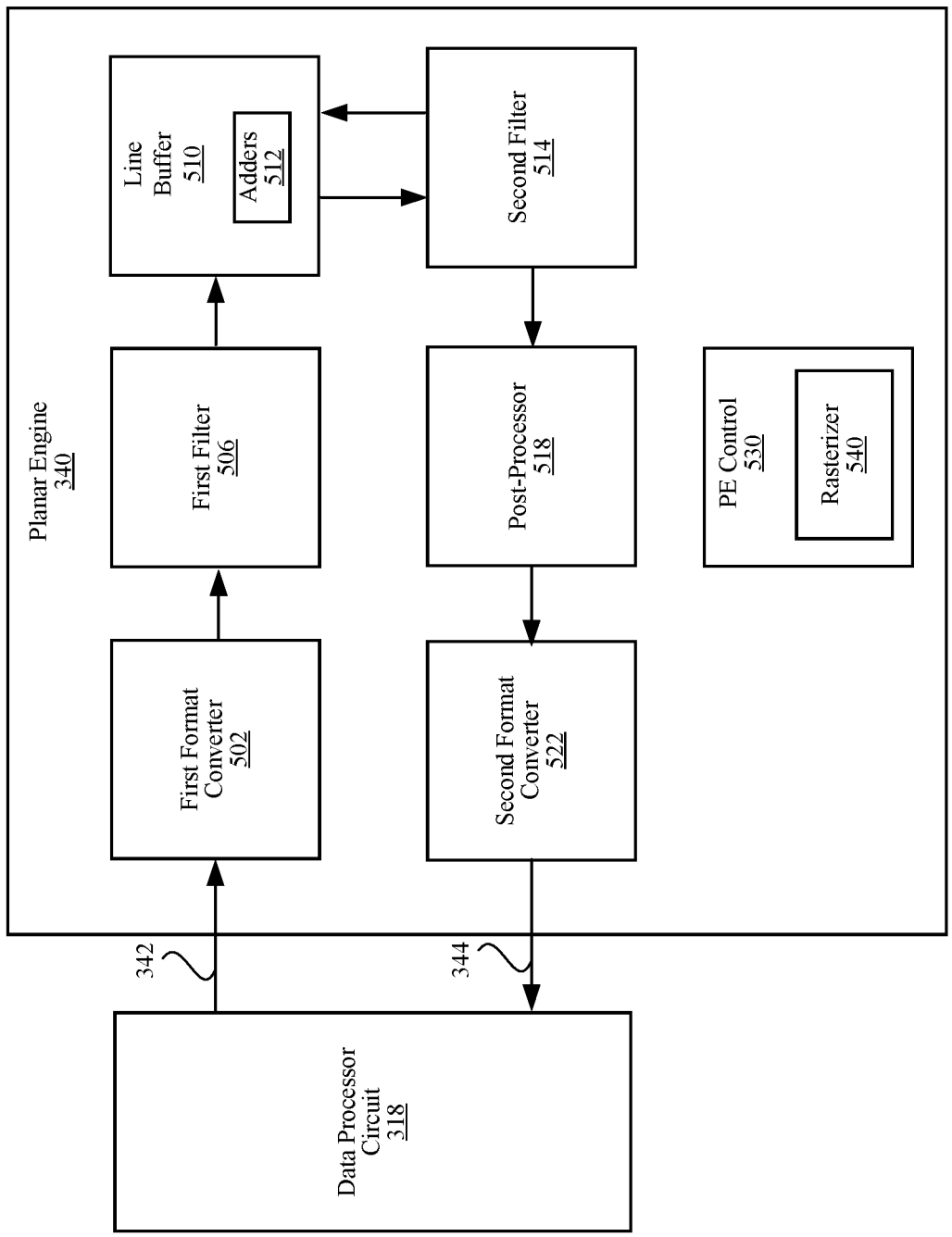
FIG. 5 is a block diagram of a planar engine in the neural processor circuit, according to one embodiment.

FIG. 5 is a block diagram of planar engine 340, according to one embodiment. Planar engine 340 is a circuit that is separated from the plurality of neural engines 314 and can be programmed to perform in different modes of operations. For example, planar engine 340 may operate in a pooling mode that reduces the spatial size of data, in a reduction mode that reduces the rank of a tensor, in a gain-and-bias mode that provides a single-pass addition of bias and scaling by a scale factor, and in an elementwise mode that includes elementwise operations. For this purpose, planar engine 340 may include, among other components, a first format converter 502, a first filter 506 (also referred to herein as "multi-mode horizontal filter 506"), a line buffer 510, a second filter 514 (also referred to herein as "multi-mode vertical filter 514"), a post-processor 518, a second format converter 522, and a planar engine (PE) control 530 (includes rasterizer 540). Planar engine 340 may include fewer components or further components not illustrated in FIG. 5. Each component in planar engine 340 may be embodied as a circuit or a circuit in combination with firmware or software.

Input data 342 of planar engine 340 may be fetched from one or more source datasets that are saved in data processor circuit 318. If a dataset to be processed by planar engine 340 is larger than a work unit of data that can be simultaneously processed by planar engine 340, such dataset may be segmented into multiple work units for reading as input data 342 to planar engine 340. Depending on the mode of planar engine 340, input data 342 may include data from one or more source datasets. The source dataset described herein refers to different data saved in neural processor circuit 218 for processing. Different components of neural processor circuit 218 may generate or transmit data that is saved in data processor circuit 318. For example, neural engines 314, planar engine 340 (which generated data in a previous operation cycle), and system memory 230 may generate or transmit different datasets that are saved in different memory locations of data processor circuit 318. Various source datasets may represent different tensors. In an operation cycle of planar engine 340, different source datasets may be fetched together as input data 342. For example, in an elementwise mode that involves the addition of two different tensors to derive a resultant tensor, the input data 342 may include data from two different source datasets, each providing a separate tensor. In other modes, a single source dataset may provide input data 342. For example, in a pooling mode, input data 342 may be fetched from a single source dataset.

First format converter 502 is a circuit that performs one or more format conversions on input data 342 in one format (e.g., a format used for storing in buffer 334) to another format for processing in subsequent components of planar engine 340. Such format conversions may include, among others, the following: applying a ReLU function to one or more values of input data 342, converting one or more values of input data 342 to their absolute values, transposing a tensor included in the sources, applying gain to one or more values of input data 342, biasing one or more values of input data 342, normalizing or de-normalizing one or more values of input data 342, converting floating-point numbers to signed or unsigned numbers (or vice versa), quantizing numbers, and changing the size of a tensor such as by broadcasting a value of a tensor in one or more dimensions to expand the rank of the tensor. The converted input data 342 and unconverted input data 342 to planar engine 340 are collectively referred to herein as "a version of the input data."

First filter 506 is a circuit that performs a filtering operation in one direction. For this purpose, first filter 506 may include, among other components, adders, comparators, and multipliers. The filtering performed by first filter 506 may be, for example, averaging, choosing a maximum value or choosing a minimum value. When averaging, adders are used to sum the values of input data 342 and a weighting factor may be applied to the sum using a multiplier to obtain the average as the resultant values. When selecting maximum and minimum values, the comparators may be used in place of the adders and the multipliers to select the values.

Line buffer 510 is a memory circuit for storing the result such as one or more intermediate data obtained from first filter 506 or second filter 514. Line buffer 510 may store values of different lines and allows access from second filter 514 or other downstream components to fetch the intermediate data for further processing. In some modes, line buffer 510 is bypassed. Line buffer 510 may also include logic circuits to perform additional operations other than merely storing the intermediate data. For example, line buffer 510 includes adder circuits 512, which in combination with memory component, enables line buffer 510 to function as an accumulator that aggregates data generated from the results of first filter 506 or second filter 514 to separately store aggregated data of a dimension not to be reduced.

Similar to first filter 506, second filter 514 performs filtering operations but in a direction different from first filter 506. For this purpose, second filter 514 may include, among other components, adders, comparators, and multipliers. In the pooling mode, first filter 506 performs filtering operation in a first dimension, while second filter 514 performs filtering operation in a second dimension. In other modes, first filter 506 and second filter 514 may operate differently. In a reduction mode, for example, first filter 506 performs elementwise operations while second filter 514 functions as a reduction tree to aggregate values of data.

Post-processor 518 is a circuit that performs further processing of values fetched from other upstream components. Post-processor 518 may include specialized circuits that are efficient at performing certain types of mathematical computations that might be inefficient to perform using a general computation circuit. Operations performed by post-processor 518 may include, among others, performing square root operations and inverse of values in a reduction mode. Post-processor 518 may be bypassed in other operation modes.

Second format converter 522 is a circuit that converts the results of preceding components in planar engine 340 from one format to another format for output data 344. Such format conversions may include, among others, the following: applying a ReLU function to the results, transposing a resultant tensor, normalizing or de-normalizing one or more values of the results, and other number format conversions. Output data 344 may be stored in data processor circuit 318 as the output of neural processor circuit 218 or as inputs to other components of neural processor circuit 218 (e.g., neural engine 314).

PE control 530 is a circuit that controls operations of other components in planar engine 340 based on the operation mode of planar engine 340. Depending on the different modes of operation, PE control 530 programs register associated with the different components in planar engine 340 so that the programmed components operate in a certain manner. The pipeline of components or connections between the components in planar engine 340 may also be reconfigured. In the pooling mode, for example, data processed at by first filter 506 may be stored in line buffer 510 and then be read by second filter 514 for further filtering. In the reduction mode, however, data is processed by first filter 506, then processed at second filter 514 and then accumulated in line buffer 510 that is programmed as an accumulator. In the elementwise mode, line buffer 510 may be bypassed.

PE control 530 also includes a rasterizer 540 that tracks the current task or process loop being processed at planar engine 340. Rasterizer 540 is a circuit that tracks units or segments of input data and/or loops for processing the input data in planar engine 340. Rasterizer 540 may control the fetch of segments to planar engine 340 in each operation cycle and may monitor the size and rank of each segment being processed by planar engine 340. For example, smaller segments of a dataset may be fetched as input data 342 in a raster order for processing at planar engine 340 until all segments of the source dataset are processed. In fetching the segments, rasterizer 540 monitors the coordinate of the segment in the dataset. The manner in which a dataset is segmented into input data 342 for processing at planar engine 340 may be different compared to how a dataset is segmented into input data 328 for processing at neural engines 314.

The dataset for processing at planar engine 340 may be larger than the capacity of planar engine 340 that can be processed in a single operation cycle. In such case, planar engine 340 fetches different segments of the dataset as input data 342 in multiple operating cycles. The fetched segment may partly overlap with a previously fetched segment and/or a next segment to be fetched. In one embodiment, the portion of overlapping data is fetched only once and reused to reduce the time and power consumption cost of planar engine 340 in fetching data.

Example Circular Buffer in Neural Processor Circuit

Figure 6:
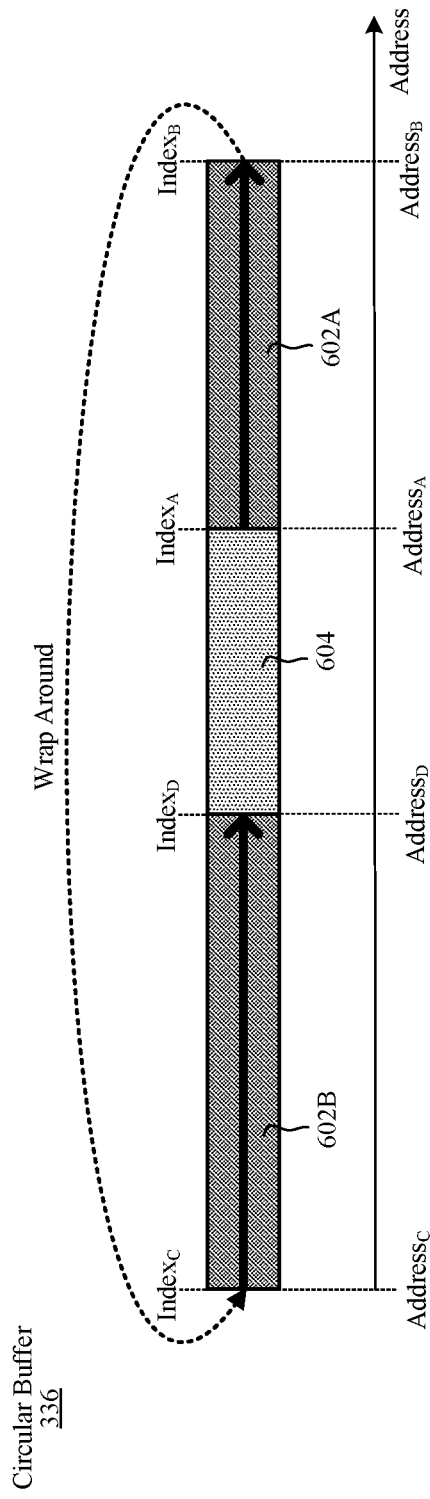
FIG. 6 illustrates a circular buffer of the neural processor circuit with an addressing layout according to circular buffering, according to one embodiment.

FIG. 6 illustrates circular buffer 336 with an addressing layout according to circular buffering, according to one embodiment. Circular buffer 336 controls data flow in neural processor circuit 218 by storing data surfaces (e.g., resident surfaces, cached surfaces, tensors, etc.) associated with operations of neural processor circuit 218 (e.g., operations of at least one neural engine 314 and/or planar engine 340) so that at least one stored data surface (e.g., at least one tensor) is wrapped around within circular buffer 336. An addressing layout of the data surface that is wrapped around in circular buffer 336 includes two segments of the data surface. A first segment the data surface occupies a remaining end portion of address space in circular buffer 336, whereas a remaining second segment of the data surface occupies a starting portion of address space in circular buffer 336.

An addressing layout of the stored data surface wrapped around in circular buffer 336 can be defined by at least one addressing parameter. Flow control circuit 332 may generate the at least one addressing parameter that defines wrapping of the data surface within circular buffer 336. Alternatively, the at least one addressing parameter may be generated by neural task manager 310. Wrapping of an addressing layout in circular buffer 336 can be set independently for data surface(s) generated by a source circuit of neural processor circuit 218 (e.g., neural engine 314 or planar engine 340 producing the at least one data surface) or for data surface(s) dedicated to a destination circuit of neural processor circuit 218 (e.g., neural engine 314 or planar engine 340 consuming the data surface stored in circular buffer 336).

In some embodiments, an addressing layout of the stored data surface within circular buffer 336 is defined using at least two addressing parameters, e.g., a first addressing parameter and a second addressing parameter. The first addressing parameter (or "StartOffset" parameter) is a parameter that defines a start address in circular buffer 336 (e.g., AddressA in FIG. 6) for storing a first segment 602A of the data surface. The second addressing parameter (or "Wrapindex" parameter) is a parameter that defines a location (e.g., an addressing index) of the data surface where wrapping into two separate segment occurs. The first and second addressing parameters can be used to determine an end address of first segment 602A in circular buffer 336 (e.g., AddressB in FIG. 6) and a start address of a second segment 602B of the data surface in circular buffer 336 (e.g., $Address_C$ in FIG. 6). If "Index" is less than "Wrapindex", then data of the data surface is stored in circular buffer 336 between AddressA and AddressB as part of first segment 602A, where "Index" is an addressing index of a wrapping dimension of the least one data surface. Thus, $Index_A=0$, $Index_B=Wrapindex-1$, $Index_C=Wrapindex$ and $Index_D=Size-1$, where "Size" is a corresponding index limit in the wrapping dimension of the data surface (e.g., Hin for an input wrapping in the height dimension, or Cout for an output wrapping in the channel dimension). The index limit in the wrapping dimension of the data surface (e.g., "Size") may further determine an end address of second segment 602B in circular buffer 336 (e.g., $Address_D$ in FIG. 6). Although second segment 602B follows first segment 602A within the data surface, second segment 602B precedes first segment 602A in address space of circular buffer 336 as the addressing layout of the data surface comprising first segment 602A and second segment 602B is wrapped around in circular buffer 336.

In some embodiments, data stored in circular buffer 336 represent a stack of multiple frames of data (e.g., video or image frames) that can be used for processing by one or more components of neural processor circuit 218. When a new frame is received, "Index" is reset to 0 (e.g., by flow control circuit 332), and data from the new frame replaces data from the oldest frame within circular buffer 336 starting from an address in circular buffer 336 determined by e.g., the first addressing parameter ("StartOffset" parameter). At some point, the first addressing parameter would be updated causing data from a new frame to be stored such that an addressing layout of the new frame is wrapped around in circular buffer 336. In such case, as shown in FIG. 6, data from the new frame are stored as first segment 602A and second segment 602B having the addressing layout wrapped around in circular buffer 336. While data from the new frame replaces data from the oldest frame at defined address space in circular buffer 336 (e.g., which could be wrapped around), each remaining frame from the stack is stored at its own address space in circular buffer 336 that remains unchanged. Thus, the circular buffering presented herein provides an efficient mechanism for rolling temporal frames used in video and image processing, while shifting (e.g., memory copying) of frames each time a new frame becomes available is avoided.

In one or more embodiments, a wrapping dimension of the least one data surface is a strided dimension, e.g., a strided tensor dimension. A strided dimension is a dimension of e.g., a tensor having an associated "Stride" parameter defining a number of elements in that dimension to skip in order to access the next element in that dimension. In such cases, addresses in circular buffer 336 defining the wrapped around addressing layout of the data surface (e.g., addresses $Address_A$, $Address_B$, $Address_C$ and $Address_D$ of circular buffer 336) may further depend on a value of "Stride" parameter representing an addressing stride in the wrapping dimension (e.g., in the strided tensor dimension). The wrapping dimension may be any of the strided dimensions, e.g., any dimension with a programmable "Stride" parameter. For example, the strided dimension that is wrapped around in circular buffer 336 can be a row dimension, channel dimension, depth dimension, or group dimension.

The first and second addressing parameters (e.g., "StartOffset" and "Wrapindex" parameters) may be programmable parameters generated by, e.g., flow control circuit 332. Alternatively, the first and second addressing parameters may be generated by neural task manager 310. Flow control circuit 332 may generate values for the first addressing parameter and the second addressing parameter to control storage of first segment 602A and second segment 602B in circular buffer 336 such that addressing space 604 of circular buffer 336 of a defined size (e.g., addressing space of circular buffer 336 with a start address of $Address_D$ and an end address of $Address_A$) is positioned between second segment 602B and first segment 602A. The values for the first addressing parameter (e.g., "Wrapindex") and the second addressing parameter ("StartOffset") may be constrained (e.g., by flow control circuit 332) such that first segment 602A does not overlap with second segment 602B within circular buffer 336. To avoid overlapping of first segment 602A with second segment 602A within circular buffer 336, either "Wrapindex" parameter is zero, or StartOffset≥Size−Wrapindex.

Circular buffer 336 may further control data flow between at least one neural engine 314 and planar engine 340 by storing a data surface (e.g., a tensor) associated with planar engine 340 in circular buffer 336 so that the data surface is wrapped around in circular buffer 336. An addressing layout of the second data surface wrapped around in circular buffer 336 may be defined by the at least one addressing parameter, e.g., by the first and second addressing parameters. The at least one addressing parameter may be appropriately updated to define a wrapped-around addressing layout within circular buffer 336 different than the wrapped-around addressing layout of first and second segments 602A, 602B. In one embodiment, flow control circuit 332 updates the at least one addressing parameter. In another embodiment, neural task manager 310 updates the at least one addressing parameter.

The same features described herein in relation to circular buffer 336 of data processor circuit 318 may apply to circular buffer 338 in data processor DMA 320. Thus, FIG. 6 can be also an illustration of circular buffer 338 with an addressing layout for storing another data surface (e.g., another tensor) with an addressing layout that is wrapped around within circular buffer 338. In such case, circular buffer 338 controls data flow between neural processor circuit 218 and system memory 230 by storing the other data surface associated with system memory 230 so that the other data surface is wrapped around in circular buffer 338. The addressing layout of the other data surface wrapped around in circular buffer 338 may be defined by one or more addressing parameters, e.g., by a pair addressing parameter (e.g., "Wrapindex" parameter and "StartOffset" parameter) defined in the same manner as in relation to circular buffer 336. In one or more embodiments, flow control circuit 332 generates the one or more addressing parameters that define wrapping of data in circular buffer 338. Alternatively, neural task manager 310 generates the one or more addressing parameters that define wrapping of data in circular buffer 338.

Example of Circular Buffer Dependency Handling

At least one neural engine 314 may operate as a first producer of first output data or as a first consumer of second output data by performing, e.g., at least convolution operations on channel basis. Planar engine 340 may operate as a second consumer receiving the first output data from the first producer (e.g., from at least one neural engine 314) or as a second producer sending the second output data to the first consumer (e.g., to at least one neural engine 314) by performing operations on channel basis (e.g., pooling operations). Circular buffer 336 may control data flow between at least one neural engine 314 and planar engine 340 by storing the first output data from the first producer or the second output data from the second producer so that an addressing layout of a subset of the first output data or a subset of the second output data is wrapped around in circular buffer 336, e.g., as defined by the at least one addressing parameter described above in conjunction with FIG. 6.

Figure 7:
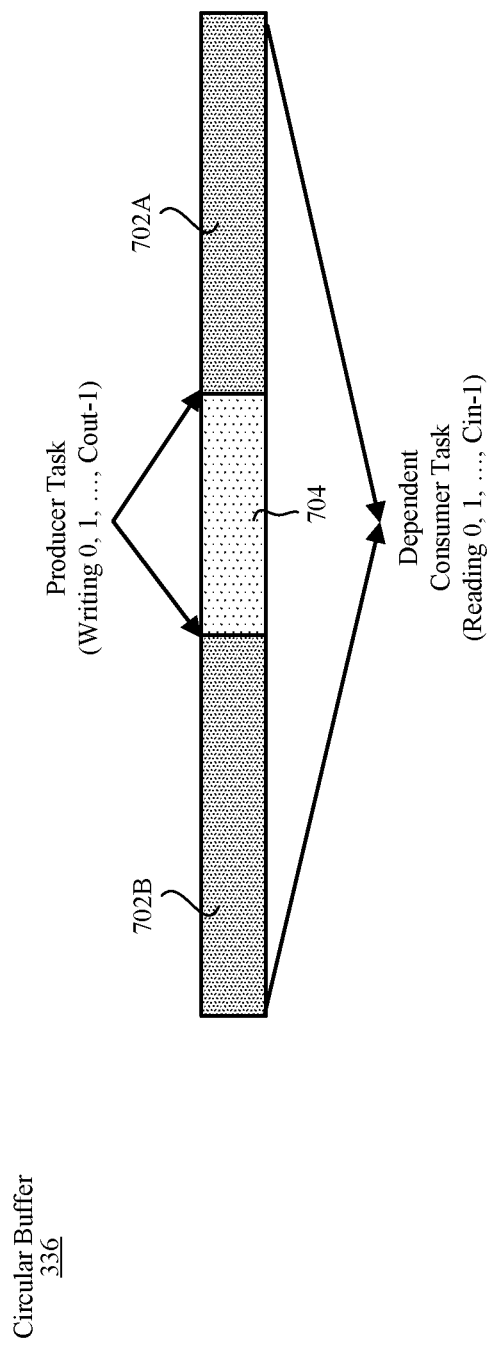
FIG. 7 illustrates storage and concatenation of a slice of data within a circular buffer of the neural processor circuit with data dependency between a producer task and a consumer task of the data, according to one embodiment.

FIG. 7 illustrates storage and concatenation of a slice of data in the case of data dependency between a producer task and a consumer task, according to one embodiment. The producer task performed by the first producer or the second producer may include one or more operations performed on channel basis producing data of, e.g., output channels 0, 1, . . . , Cout-1. As shown in FIG. 7, a data slice 704 produced during the producer task is written into circular buffer 336 of data processor circuit 318 that controls data flow between the first producer and the first consumer (or between the second producer and the second consumer). Although FIG. 7 illustrates circular buffer 336 it should be noted that data dependency between a producer task and a consumer task can be independent of wrapping of data within circular buffer 336. Data slice 704 may be written into address space of circular buffer 336 between a data segment 702B and a data segment 702A (e.g., previously produced by the first producer or the second producer). Data segments 702A, 702B may include a data surface (e.g., tensor) with an addressing layout that is wrapped around within circular buffer 336. Data segments 702A, 702B and data slice 704 may be consumed by the first consumer or the second consumer during a consumer task that is data dependent on the producer task. For example, the consumer task may read data from data segments 702A, 702B and data slice 704 while performing one or more operations on channel basis (e.g., on input channels 0, 1, . . . , Cin-1).

Data dependency between the producer task and the consumer task can be handled based on address index values (e.g., "Index" values) of the first producer and the first consumer (or the second producer and the second consumer), as opposed to wrapped index values (e.g., "Wrapindex" values). Circular buffer 336 provides support for dependent concatenations, e.g., dependency of the first consumer (or the second consumer) on data slice 704 that is being concatenated within circular buffer 336 with existing data slices previously stored in circular buffer 336 (e.g., as part of data segments 702A, 702B).

In an example scenario, a dependent write of the producer task produces the last remaining slice of a larger tensor (e.g., slice 704), while other segments (e.g., segments 702A, 702B) have been written earlier within circular buffer 336 by operations of the producer task or one or more other tasks. Thus, slice 704 may be produced by the first producer as part of the first output data or by the second producer as part of the second output data. In such case, circular buffer 336 may control data flow between at least one neural engine 314 and planar engine 340 by concatenating, within circular buffer 336, slice 704 with a portion of the first output data or a portion of the second output data previously stored in circular buffer 336, e.g., with portions of segments 702A, 702B wrapped around within circular buffer 336.

Since the first producer and the first consumer (or the second producer and the second consumer) have different notions on where their respective index values start and end within a tensor, their indices cannot be directly compared in order to control data flow between the first producer and the first consumer (or between the second producer and the second consumer). To address such discrepancy, a dependency offset parameter (e.g., "DependencyOffset") is added to each data source (e.g., source buffer) of the producer task and of the consumer task. Note that the producer task and the consumer task can have different source buffers while a result buffer of the producer task can be a source buffer of the consumer task. Since the data dependency between the producer task and the consumer task occurs when these two tasks share a common buffer, the dependency offset parameter for the source buffer of the consumer task represents a difference in coordinate spaces between the result buffer of the producer task and the source buffer of the consumer task. Thus, the dependency offset parameter for the source buffer of the consumer task involves an interaction between the producer task and the consumer task.

Data dependency between the producer task and the consumer task can be analyzed if there is a shared buffer (e.g., circular buffer 336) common for the producer task and the consumer task. The producer task may write data into some part of circular buffer 336, and the consumer task may consume certain portion of data stored in circular buffer 336. For example, the producer task produces Np rows (or columns) of data starting at a crop offset of Sp (e.g., "Producer.CropOffset"), and writes rows (or columns) Sp, Sp+1, Sp+Np-1 in circular buffer 336. The producer task consumes Nc rows (or columns) starting at a crop offset of Sc (e.g., "Consumer.CropOffset"), and reads rows (or columns) Sc, Sc+1, Sc+Nc-1 in circular buffer 336. The producer task and the consumer task address the shared buffer space (e.g., circular buffer 336) in their own local crop coordinate spaces. Thus, the producer task indexes the shared buffer space (e.g., circular buffer 336) as Ip=0, 1, . . . , Np-1, whereas the consumer task indexes the shared buffer space (e.g., circular buffer 336) as Ic=0, 1, . . . , Nc-1. The index Ip can be referred to as "Consumer.Index" and the index Ic can be referred to as "Producer.Index."

To provide accurate flow control between the producer task and the consumer task, flow control circuit 332 (or neural task manager 310) operates within a coordinate space (e.g., tensor coordinate space) that is adjusted based on the crop offset of the producer task (e.g., "Producer.CropOffset") and the crop offset of the consumer task (e.g., "Consumer.CropOffset"). These two crop offsets are combined into a single parameter of the consumer task consumer, i.e., into a dependency offset parameter of the consumer task (e.g., "Consumer.DependencyOffset"). Flow control circuit 332 may allow the consumer task to consume data from the shared buffer space (e.g., from circular buffer 336) when Consumer.Index+(Consumer.CropOffset-Producer. CropOffset)<Producer.Index, which is equivalent to Consumer.Index<Consumer.DependencyOffset+Producer.Index. Note that Consumer.DependencyOffset is defined as the crop offset of the consumer task (e.g., "Consumer.CropOffset") decreased by (or adjusted by) the crop offset of the producer task (e.g., "Producer.CropOffset"). The adjustment of coordinate spaces of the producer task and the consumer task for accurate flow control between these two tasks is required in any scenario where the producer task and the consumer task perform cropped access of a shared memory space, e.g., access to a shared tensor stored within circular buffer 336.

Thus, the dependency offset parameter is employed when a source buffer of the consumer task is marked as "dependent," and is added to the producer's index value to compare indices of the producer task and the consumer task for accurate flow control (e.g., performed by flow control circuit 332 or neural task manager 310). The dependent first consumer (or the second consumer) may proceed (e.g., by flow control circuit 332 or neural task manager 310) if the first producer (or the second producer) has finished writing of all data into circular buffer 336, or if an address index of the first consumer (or the second consumer) is less than a sum of an address index of the first producer (or the second producer) and a dependency offset parameter of the first consumer (or the second consumer). A positive value of the dependency offset parameter implies that some initial portion of a tensor has already been written into circular buffer 336 by the producer task of the first producer (or the second producer) and is immediately available for consumption by the consumer task of the first consumer (or the second consumer). A negative value of the dependency offset parameter implies that the producer task is producing more data than the consumer is currently consuming. In such case, the consumer task may need to wait longer for the producer task to finish producing data before the consumer task can start a cropped access of a shared memory space (e.g., of circular buffer 336). Flow control circuit 332 may allow the first consumer (or the second consumer) to consume a portion of the second output data (or a portion of the first output data) from circular buffer 336 when an index value of the first consumer (or the second consumer) for reading from circular buffer 336 (e.g., "Consumer.Index") is less than a sum of an index value of the first producer (or the second producer) for writing into circular buffer 336 (e.g., "Producer.Index") and a dependency offset parameter of the first consumer (or the second consumer) (e.g., "Consumer.DependencyOffset").

Slice 704 may be concatenated within circular buffer 336 with the portion of the first output data (or the portion of the second output data) previously stored in circular buffer (e.g., with one or more slices previously stored in circular buffer 336 as part of data segments 702A, 702B) in a data dimension selected from the group comprising a height dimension (Y dimension), a depth dimension (Z dimension), a flattened channel dimension (GC dimension), or some other dimension. The flattened channel dimension can be obtained by flattening of a group dimension (G dimension) and a channel dimension (C dimension). The flattened channel dimension defines the index value to be equal to Group*NumChannels+Channel where NumChannels is Cin for a source (e.g., the first producer or the second producer) or Cout for a destination (e.g., the first consumer or the second consumer), Group is a current group being processed, and Channel is a current channel being processed. Flattened group dependencies allow the first producer (or the second producer) and the first consumer (or the second consumer) to work on an effectively reshaped version of a tensor between the first producer and the second consumer (or between the second producer and the second consumer). In some embodiments, a portion of data surface (e.g., a sub-tensor) sliced in more than one dimension can be concatenated within circular buffer 336.

In an embodiment, the concatenation performed in circular buffer 336 can be to one or more data slices that are stored as non-wrapped within circular buffer 336. In another embodiment, the concatenation performed in circular buffer 336 can be to one or more data slices that are wrapped around within circular buffer 336. However, a concatenation dimension (axis) may be different than a wrapping dimension (axis) of circular buffer 336. When data wrapped around in circular buffer 336 is marked as "dependent," then both the first producer and the first consumer (or the second producer and the second consumer) treat the wrapped data as having the same shape of wrapped addressing layout, except when the first producer (or the second producer) is performing the concatenation. In such case, a data slice generated by the first producer (or the second producer) of the concatenation dimension represents a subset of a data slice consumed by the first consumer (or the second consumer). Due to the above constraints, the flow control (e.g., performed by flow control circuit 332 and/or neural task manager 310) between the first producer (or the second producer) and the first consumer (or the second consumer) operates in a forward looking manner so that the first producer (or the second producer) is not back-pressured by the first consumer (or the second consumer) to complete a task. This is because the first producer (or the second producer) does not overwrite data that the first consumer (or the second consumer) is about to read. As discussed above, there is a constraint of circular buffer that StartOffset≥Size−Wrapindex, where Size is an extent of a task (e.g., an index limit) in the wrapping dimension. This constraint can be interpreted as that a last physical position written to circular buffer 336 by the producer task cannot overrun a first physical position in circular buffer 336 accessed by the consumer task. Thus, an individual accessor (e.g., the producer task and/or the consumer task) cannot access a same portion of circular buffer 336 more than once. Hence, there is no need to back-pressure the producer task because the producer task would not overwrite data previously produced by the producer task and not yet consumed by the consumer task.

The first producer (or the second producer) and the first consumer (or the second consumer) may have different values for addressing parameters due to relative coordinate system shifts caused by the concatenation sub-slice, but the underlying tensor layout within circular buffer 336 would be the same. The dependency feature is available on both source surfaces used in operations (e.g., element-wise operations) of planar engine 340, with separate dependency offset settings for each source surface.

The same features described herein in relation to FIG. 7 and circular buffer 336 of data processor circuit 318 may also apply to circular buffer 338 of data processor DMA 320. Handling of circular buffering by data processor DMA 320 is substantially the same as handling of circular buffering by data processor circuit 318, including the dependency offset feature. Data dependencies handled by circular buffer 338 of data processor DMA 320 may occur between a read client of data processor DMA 320 and a write client of data processor DMA 320. A task-distance between data dependencies handled by circular buffer 338 of data processor DMA 320 may be larger than a task-distance of data dependencies handled by circular buffer 336 of data processor circuit 318 as there could be more tasks between a producer task associated with data processor DMA 320 and a consumer task associated with data processor DMA 320.

In some embodiments, either circular buffer 336 of data processor circuit 318 is utilized (e.g., when a tensor is resident in buffer memory 334 of data processor circuit 318) or circular buffer 338 of data processor DMA 320 is utilized (e.g., when a tensor is external), but not both. In some other embodiments, e.g., for a binary operation of planar engine 340, one source tensor may be external and one source tensor may be resident. As these two tensors may have independent wrapping and data dependencies, circular buffer 338 in data processor DMA 320 and circular buffer 336 in data processor circuit 318 may be simultaneously utilized. In some other embodiments, a cached buffer can be employed that is both externally wrapped (e.g., in its surface in data processor DMA 320) and internally wrapped (e.g., in its cached surface in data processor circuit 318). These two surfaces of the cached buffer may have distinct wrapping points (e.g., in the same wrapping dimension). In such cases, these two surfaces of the cached buffer can be simultaneously utilized as circular buffer 336 of data processor circuit 318 and circular buffer 338 of data processor DMA 320.

Example of Wrapping and Concatenation Dependency

Figure 8A:
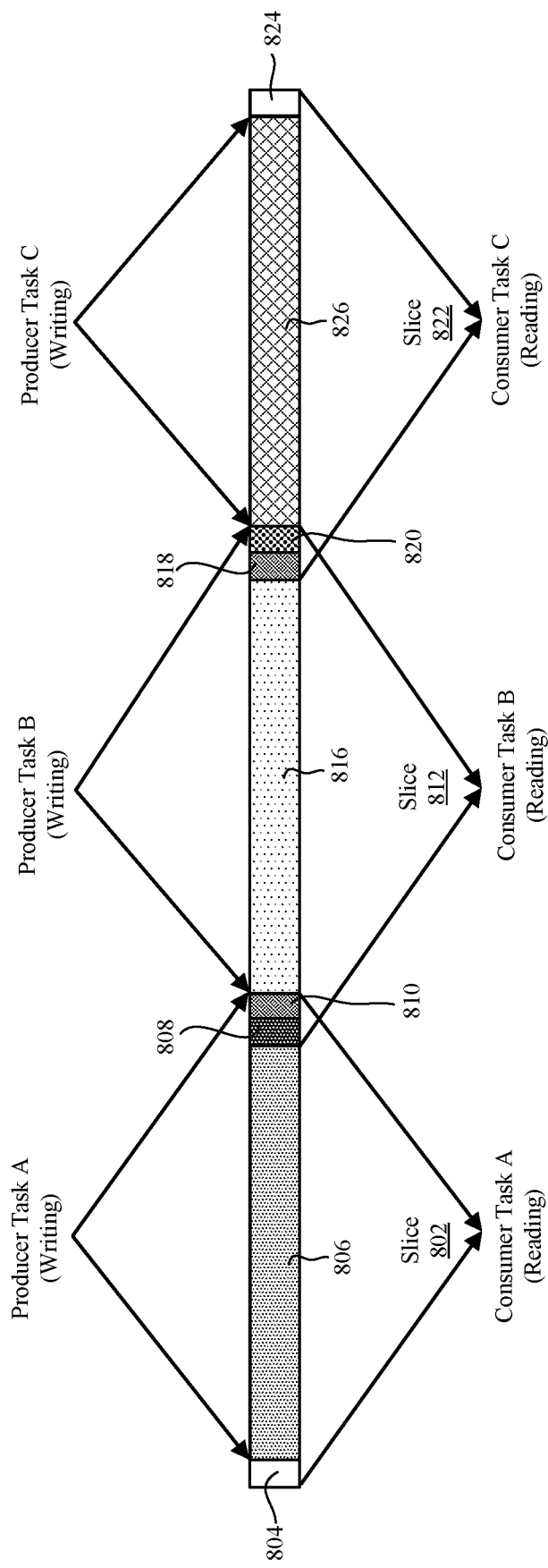
FIG. 8A illustrates an example buffering of multiple slices of data with data dependency between tasks of a producer and tasks of a consumer in the neural processor circuit, according to one embodiment.

FIG. 8A illustrates an example buffering of multiple data slices with data dependency between tasks of a producer and tasks of a consumer in neural processor circuit 218, according to one embodiment. In one embodiment, the producer may be at least one neural engine 314 and the consumer may be planar engine 340. In another embodiment, the producer may be planar engine 340 and the consumer may be at least one neural engine 314. In yet another embodiment, the producer may be at least one neural engine 314 and the consumer may be at least one neural engine 314, same or different than at least one neural engine 314 representing the producer.

In the following, an example of processing data that is spatially tiled in a neural network is described with reference to FIG. 8A. In this example the producer is at least one component of neural processor circuit 218 that operates as a first layer of the neural network (e.g., at least one neural engine 314), and the consumer is at least one component of neural processor circuit 218 that operates as a second layer of the neural network and consumes data produced by the first layer (e.g., planar engine 340). Further, in this example, the producer may produce a resulting surface (e.g., an unsliced tensor) having a height of, e.g., N rows, and the consumer may consume the resulting surface using a specific kernel to produce another surface having a height of, e.g., N rows.

As shown in FIG. 8A, during a producer task A, the producer may produce output data 806 (e.g., $N_A$ rows) and overwork data 808-810 (e.g., one row each). Overwork data 808-810 correspond to overfetched rows of a consumer's source surface that recomputed by the producer during the producer task A. The consumer may consume, during a consumer task A that is data dependent on the producer task A, a slice 802 including padding data 804 (e.g., one row), output data 806, and overwork data 808-810. The producer may further produce output data 816 (e.g., $N_B$ rows) and overwork data 818-820 (e.g., one row each) during a producer task B that follows the producer task A. Overwork data 818-820 correspond to overfetched rows of another consumer's source surface recomputed by the producer during the producer task B. The consumer may further consume, during a consumer task B that is data dependent on the producer task B and follows the consumer task A, a slice 812 including overwork data 808-810, output data 816 and overwork data 818-820. The producer may further produce output data 826 (e.g., $N_C$ rows) during a producer task C that follows the producer task B. The consumer may consume, during a consumer task C that is data dependent on the producer task C and follows the consumer task B, a slice 822 including overwork data 818-820, output data 826, and padding data 824 (e.g., one row).

After reading slice 802, the consumer (e.g., the second layer) may produce $N_A$ rows of output during the consumer task A. To generate slice 802 (e.g., of $N_A$+3 rows), the producer (e.g., the first layer) may need to produce, during the producer task A, $N_A$+2 rows of output (e.g., output data 806 of $N_A$ rows and two more rows of overwork data 808-810) that together with one row of padding data 804 form slice 802. After reading slice 812, the consumer (e.g., the second layer) may produce the next $N_B$+2 rows of output during the consumer task B. To generate slice 812 (e.g., of $N_B$+4 rows), the producer (e.g., the first layer) produces, during the producer task B, $N_B$+2 rows of output (e.g., output data 816 of $N_B$ rows, two more rows of overwork data 818-820, excluding two rows of overwork data 808-810 from slice 802). After reading slice 822, the consumer (e.g., the second layer) may produce, during the consumer task C, the final $N_C$+1 rows of output. To generate slice 822 (e.g., of $N_C$+3 rows), the producer (e.g., the first layer) produces $N_C$ rows of output (e.g., output data 826 of $N_C$ rows) that together with overwork data 818-820 from slice 812 and padding data 824 form slice 822 for the consumer.

The resulting surface (e.g., the unsliced tensor having a high of N rows, N=$N_A$+$N_B$+$N_C$+4) produced by the producer during the producer tasks A, B and C includes data surface 806, overwork data 808-810, data surface 816, overwork data 818-820 and data surface 826. In some embodiments, the resulting surface is spatially tiled into multiple slices (e.g., M slices, each having a height of N|M rows). This may be achieved using, e.g., circular buffer 336 with a height dimension (Y dimension) being a wrapping dimension for retaining the overwork between slices. Since the largest overall contiguous set of input data for the consumer (e.g., the second layer) is $N_A$+3 rows, a size of an intermediate Y-wrapped circular buffer 336 can be, e.g., at least $N_A$+3 rows (rows 0, 1, . . . , $N_A$+2).

Figure 8B:
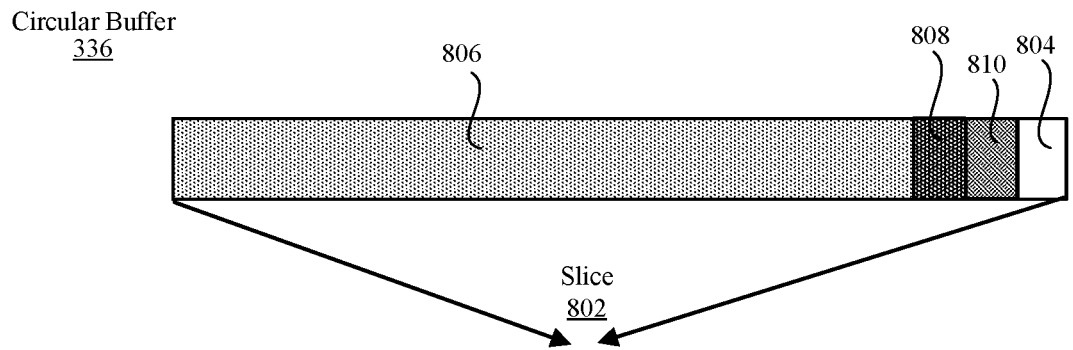
FIG. 8B illustrates an example storage of a first data slice in a circular buffer of the neural processor circuit, according to one embodiment.

FIG. 8B illustrates an example storage of slice 802 in circular buffer 336, according to one embodiment. Slice 802 may be written in address space of circular buffer 336, during the producer task A, as output data 806 followed by overwork data 808-810 and padding data 804. In this example, the producer sets Hout and the consumer sets Hin. As shown in FIG. 8B, an address space of any portion of slice 802 does not need to be Y-wrapped within circular buffer 336. The dependency offset parameter (e.g., DependencyOffset) for both the producer and the consumer can be set to zero, because both the producer and the consumer are addressing slice 802 in circular buffer 336 using the same coordinate system.

Figure 8C:
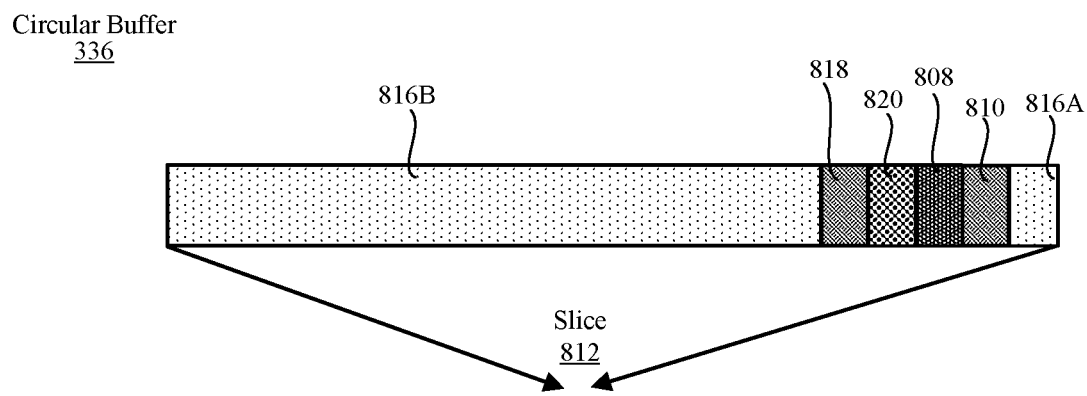
FIG. 8C illustrates an example storage of a second data slice in the circular buffer having an addressing layout wrapped around within the circular buffer, according to one embodiment.

FIG. 8C illustrates an example storage of slice 812 in circular buffer 336, according to one embodiment. Slice 812 may be written in address space of circular buffer 336 during the producer task B as output data segment 816B, followed by overwork data 818-820, overwork data 808-810 from slice 802 and output data segment 816A. Output data segments 816A, 816B form output data 816, wherein an addressing space of output data 816 is wrapped around in circular buffer 336, as shown in FIG. 8C. The producer sets Hout, StartOffset and Wrapindex causing the first output row of slice 812 (e.g., output data segment 816A corresponding to row $N_A$+2 in the unsliced tensor of FIG. 8A) to be written to the last row $N_A$+2 of circular buffer 336. The next output row would wrap back around to a start of circular buffer 336, and the remaining output rows would fill out the rest of circular buffer 336 having a total of $N_A$+3 rows. The consumer sets Hin, StartOffset, Wrapindex and Dependency Offset. The consumer may start consuming the slice 812 with two rows of overwork data 808-810 from slice 802 (a concatenation), which causes modification of addressing parameters of the consumer relative to addressing parameters of the producer. As seen from FIG. 8C, overwork data 808-810 from slice 802 are concatenated within circular buffer 336 to new output data produced by the producer during the producer task B to form slice 812.

Figure 8D:
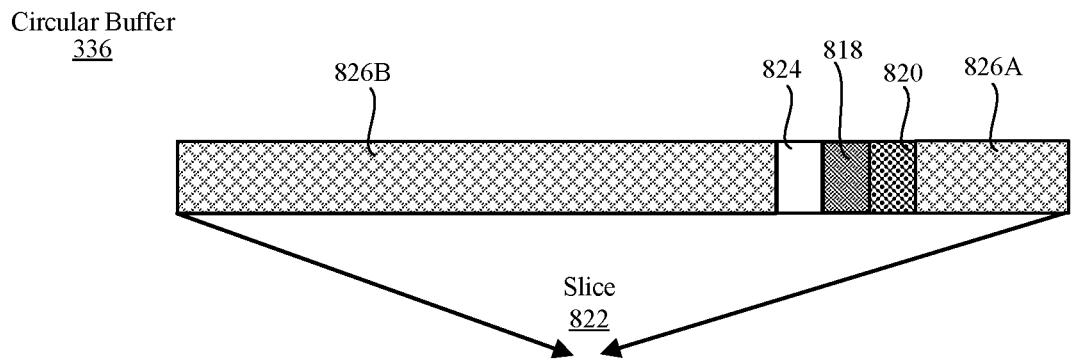
FIG. 8D illustrates an example storage of a third data slices in the circular buffer having an addressing layout wrapped around within the circular buffer, according to one embodiment.

FIG. 8D illustrates an example storage of slice 822 in circular buffer 336, according to one embodiment. Slice 822 may be written in address space of circular buffer 336 during the producer task C as output data segment 826B, followed by padding data 824, overwork data 818-820 from slice 812, and output data segment 826A. Output data segments 826A, 826B form output data 826, wherein an addressing space of output data 826 is wrapped around in circular buffer 336, as shown in FIG. 8D. The producer sets Hout, StartOffset and Wrapindex causing the first three rows of slice 822 (e.g., output data segment 826A) to be written into the last three rows of circular buffer 336 that are adjacent to the two retained rows from slice 812 (e.g., overwork data 818-820). The remaining rows can be written to a start of circular buffer 336, e.g., as output data segment 826B. The consumer sets Hin, StartOffset, Wrapindex and DependencyOffset. The concatenation of the two rows from slice 812 (e.g., concatenation of overwork data 818-820 within circular buffer 336 to new output data produced by the producer during the producer task C) can be accounted for by appropriately adjusting the addressing parameters of the producer.

The above examples are merely illustrative, and the parameters may be such that to accommodate various neural network configurations. Furthermore, the above example of the producer being at least one neural engine 314 and the consumer being planar engine 340 is merely illustrative, and the producer can be planar engine 340 and the consumer can be at least one neural engine 314, or an output of one or more neural engines 314 can be fed to one or more other neural engines 314.

Example Processes at Neural Engine Architecture

Figure 9:
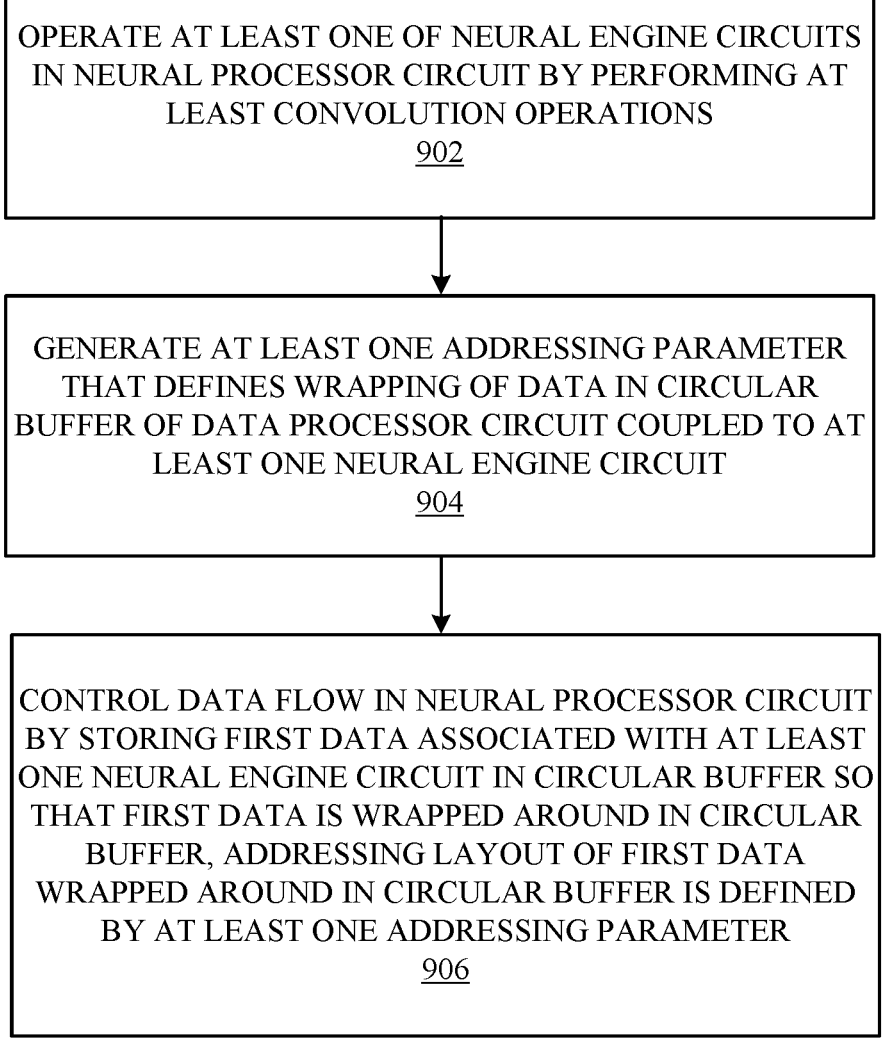
FIG. 9 is a flowchart illustrating a method of performing control of data flow in the neural processor circuit using a circular buffer, according to one embodiment.

FIG. 9 is a flowchart illustrating a method of controlling data flow in a neural processor circuit using a circular buffer, according to one embodiment. The circular buffer may be part of a data processor circuit (e.g., data processor circuit 318) coupled to at least one neural engine circuit (e.g., neural engine 314). The neural processor circuit operates 902 the at least one neural engine circuit by performing at least convolution operations.

The neural processor circuit generates 904 (e.g., via flow control circuit 332) at least one addressing parameter that defines wrapping of data in the circular buffer of the data processor circuit. Operations 902 and 904 can be performed in parallel or in reverse order. The neural processor circuit controls 906 data flow in the neural engine circuit by storing first data associated with the at least one neural engine circuit in the circular buffer so that the first data is wrapped around in the circular buffer, wherein an addressing layout of the first data wrapped around in the circular buffer is defined by the at least one addressing parameter.

The circular buffer may control data flow between a producer (e.g., at least one neural engine 314) and a consumer (e.g., planar engine 340) by storing output data from the producer so that an addressing layout of a portion of the output data is wrapped around in circular buffer 336, e.g., as defined by the at least one addressing parameter. The consumer may start consuming a subset of the output data stored in circular buffer 336 even before the entire output data is generated and stored in circular buffer 336.

Figure 10:
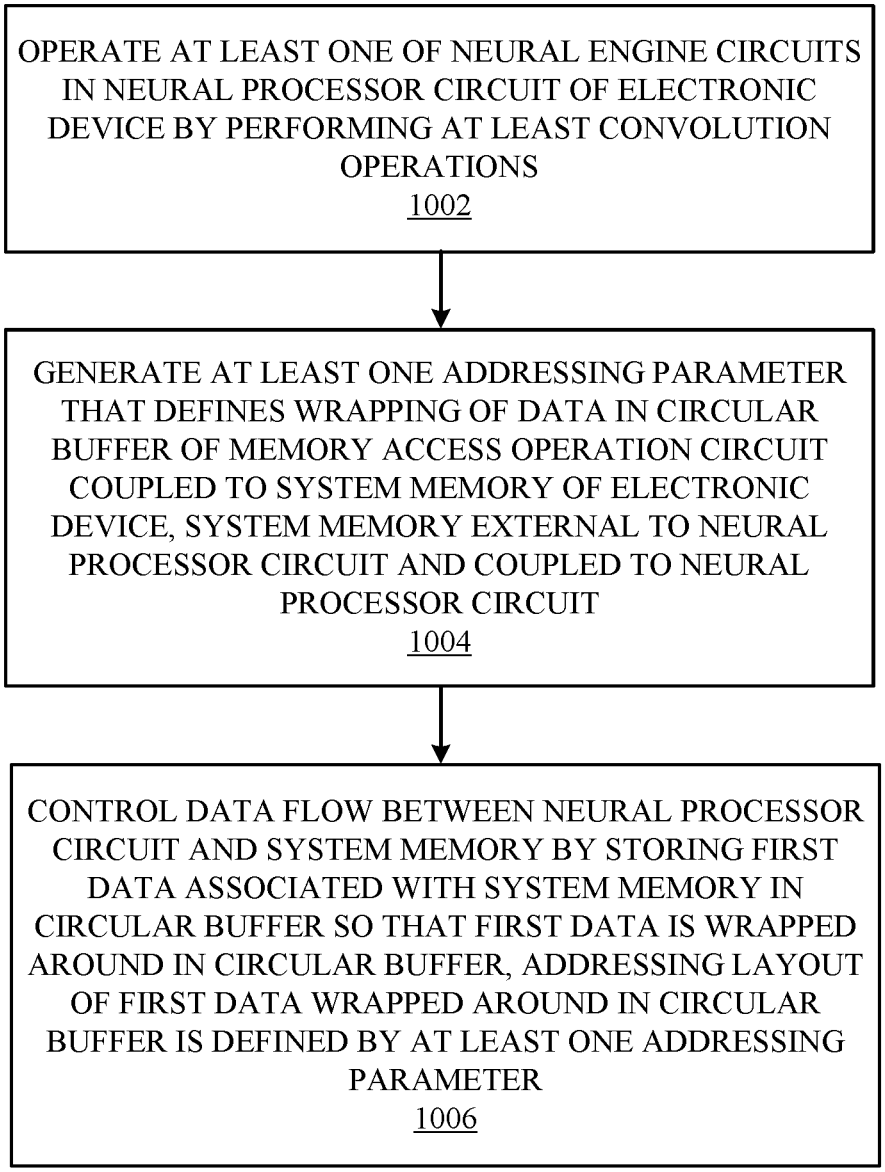
FIG. 10 is a flowchart illustrating a method of performing control of data flow between the neural processor circuit and a system memory external to the neural processor circuit using a circular buffer, according to one embodiment.

FIG. 10 is a flowchart illustrating a method of controlling data flow between a neural processor circuit and a system memory using a circular buffer, according to one embodiment. The circular buffer may be part of a memory access operation circuit (e.g., data processor DMA 320) coupled to the system memory (e.g., system memory 230), the system memory external to the neural processor circuit and coupled to the neural processor circuit via the memory access operation circuit The neural processor circuit operates 1002 at least one neural engine circuit (e.g., neural engine 314) by performing at least convolution operations.

The neural processor circuit generates 1004 (e.g., via flow control circuit 332) at least one addressing parameter that defines wrapping of data in the circular buffer of the memory access operation circuit. Operations 1002 and 1004 can be performed in parallel or in reverse order. The neural processor circuit controls 1006 data flow between the neural processor circuit and the system memory by storing second data associated with the system memory in the circular buffer so that the second data is wrapped around in the circular buffer, wherein an addressing layout of the second data wrapped around in the circular buffer is defined by the at least one addressing parameter.

Embodiments of the processes as described above with reference to FIG. 9 and FIG. 10 are merely illustrative. Moreover, sequences of the processes may be modified or omitted.

While particular embodiments and applications have been illustrated and described, it is to be understood that the invention is not limited to the precise construction and components disclosed herein and that various modifications, changes and variations which will be apparent to those skilled in the art may be made in the arrangement, operation and details of the method and apparatus disclosed herein without departing from the spirit and scope of the present disclosure.

What is claimed is:

1. A neural processor circuit, comprising:
a plurality of neural engine circuits, at least one of the neural engine circuits configured to perform at least convolution operations; and
a data processor circuit coupled to the at least one neural engine circuit, the data processor circuit including:
a circular buffer, and
a flow control circuit coupled to the circular buffer, the flow control circuit configured to generate a plurality of addressing parameters that defines wrapping of data in the circular buffer, wherein:
the circular buffer is configured to control data flow in the neural processor circuit by storing first data associated with the at least one neural engine circuit so that the first data is wrapped around in the circular buffer,
an addressing layout of the first data wrapped around in the circular buffer is defined by the plurality of addressing parameters, and
the plurality of addressing parameters comprises:
a first addressing parameter that determines a start address in the circular buffer for storing the first data; and
a second addressing parameter that determines an end address of a first segment of the first data in the circular buffer and a start address of a second segment of the first data in the circular buffer, the second segment following the first segment within the first data, the second segment preceding the first segment within the circular buffer.

2. The neural processor circuit of claim 1, further comprising a planar engine circuit coupled to the data processor circuit, the planar engine circuit configured to perform at least operations on a channel basis, and wherein:

the flow control circuit is further configured to update the plurality of addressing parameters; and the circular buffer is further configured to control data flow between the at least one neural engine circuit and the planar engine circuit by storing second data associated with the planar engine circuit in the circular buffer so that the second data is wrapped around in the circular buffer, an addressing layout of the second data wrapped around in the circular buffer defined by the plurality of updated addressing parameters.

3. The neural processor circuit of claim 1, wherein the flow control circuit is further configured to:

generate the first addressing parameter and the second addressing parameter for controlling storage of the first and second segments in the circular buffer such that a defined addressing space of the circular buffer is between the second segment and the first segment.

4. The neural processor circuit of claim 1, wherein the first segment of the first data stored in the circular buffer does not overlap with the second segment of the first data stored in the circular buffer.

5. The neural processor circuit of claim 1, wherein:

the at least one neural engine circuit is configured to operate as a first producer of first output data or a first consumer of second output data by performing the at least convolution operations on a channel basis;

the neural processor circuit further comprises a planar engine circuit coupled to the data processor circuit, the planar engine circuit configured to operate as a second consumer receiving the first output data from the first producer or a second producer sending the second output data to the first consumer by performing at least operations on the channel basis; and the circular buffer is further configured to control data flow between the at least one neural engine circuit and the planar engine circuit by storing the first output data from the first producer or the second output data from the second producer so that an addressing layout of a subset of the first output data or a subset of the second output data is wrapped around in the circular buffer.

6. The neural processor circuit of claim 5, wherein the flow control circuit is configured to allow the first consumer to consume a portion of the second output data from the circular buffer or the second consumer to consume a portion of the first output data from the circular buffer in response to an index value of the first consumer or the second consumer for reading from the circular buffer being less than a sum of an index value of the first producer or the second producer for writing to the circular buffer and a dependency offset value of the first consumer or the second consumer.

7. The neural processor circuit of claim 5, wherein:

the first producer is configured to produce a slice of the first output data or the second producer is configured to produce a slice of the second output data; and the circular buffer is further configured to control data flow between the at least one neural engine circuit and the planar engine circuit by concatenating in the circular buffer the slice of the first output data or the slice of the second output data with a portion of the first output data or a portion of the second output data previously stored in the circular buffer.

8. The neural processor circuit of claim 7, wherein the circular buffer is further configured to:

concatenate the slice of the first output data or the slice of the second output data with the portion of the first output data or the portion of the second output data in a dimension of the first output data or the second output data selected from a group comprising a height dimension, a depth dimension, and a flattened channel dimension obtained by flattening of a group dimension and a channel dimension.

9. The neural processor circuit of claim 1, further comprising:

a memory access operation circuit coupled to a system memory external to the neural processor circuit and coupled to the neural processor circuit, the memory access operation circuit including another circular buffer, wherein:

the flow control circuit is further configured to generate another plurality of addressing parameters that defines wrapping of data in the other circular buffer, and the other circular buffer is configured to control data flow between the neural processor circuit and the system memory by storing second data associated with the system memory so that the second data is wrapped around in the other circular buffer, an addressing layout of the second data wrapped around in the other circular buffer defined by the other plurality of addressing parameters.

10. The neural processor circuit of claim 9, wherein the neural processor circuit and the system memory are integrated into an electronic device.

11. A method of operating a neural processor circuit, comprising:

operating at least one neural engine circuit of a plurality of neural engine circuits by performing at least convolution operations;

generating a plurality of addressing parameters that defines wrapping of data in a circular buffer of a data processor circuit coupled to the at least one neural engine circuit;

controlling data flow in the neural processor circuit by storing first data associated with the at least one neural engine circuit in the circular buffer so that the first data is wrapped around in the circular buffer, wherein an addressing layout of the first data wrapped around in the circular buffer is defined by the plurality of addressing parameters;

operating a planar engine circuit coupled to the data processor circuit by performing at least operations on a channel basis;

updating the plurality of addressing parameters; and controlling data flow between the at least one neural engine circuit and the planar engine circuit by storing second data associated with the planar engine circuit in the circular buffer so that the second data is wrapped around in the circular buffer, wherein an addressing layout of the second data wrapped around in the circular buffer is defined by the updated plurality of addressing parameters.

12. The method of claim 11, wherein the plurality of addressing parameters comprises:

a first addressing parameter that determines a start address in the circular buffer for storing the first data; and a second addressing parameter that determines an end address of a first segment of the first data in the circular buffer and a start address of a second segment of the first data in the circular buffer, the second segment following the first segment within the first data, the second segment preceding the first segment within the circular buffer.

13. The method of claim 12, further comprising:
generating the first addressing parameter and the second addressing parameter for controlling storage of the first and second segments in the circular buffer such that a defined addressing space of the circular buffer is between the second segment and the first segment.

14. The method of claim 11, further comprising:
generating another plurality of addressing parameters that define wrapping of data in another circular buffer in a memory access operation circuit coupled to a system memory external to the neural processor circuit and coupled to the neural processor circuit; and
controlling data flow between the neural processor circuit and the system memory by storing second data associated with the system memory in the other circular buffer so that the second data is wrapped around in the other circular buffer, wherein an addressing layout of the second data wrapped around in the other circular buffer is defined by the other plurality of addressing parameters.

15. The method of claim 11, further comprising:
operating the at least one neural engine circuit as a first producer of first output data or a first consumer of second output data by performing the at least convolution operations on a channel basis;
operating a planar engine circuit of the neural processor circuit coupled to the data processor circuit as a second consumer receiving the first output data from the first producer or a second producer sending the second output data to the first consumer by performing the at least operations on channel basis; and
controlling data flow between the at least one neural engine circuit and the planar engine circuit by storing the first output data from the first producer or the second output data from the second producer in the circular buffer so that an addressing layout of a portion of the first output data or a portion of the second output data is wrapped around in the circular buffer.

16. The method of claim 15, further comprising:
instructing the first consumer to consume a portion of the second output data from the circular buffer or the second consumer to consume a portion of the first output data from the circular buffer in response to an index value of the first consumer or the second consumer for reading from the circular buffer being less than a sum of an index value of the first producer or the second producer for writing to the circular buffer and a dependency offset value of the first consumer or the second consumer.

17. The method of claim 15, further comprising:
producing a slice of the first output data by the first producer or a slice of the second output data by the second producer; and
controlling data flow between the at least one neural engine circuit and the planar engine circuit by concatenating in the circular buffer the slice of the first output data or the slice of the second output data with a portion of the first output data or a portion of the second output data previously stored in the circular buffer.

18. An electronic device, comprising:
a system memory; and
a neural processor circuit coupled to the system memory, the neural processor circuit including:
at least one neural engine circuit configured to perform at least convolution operations,
a memory access operation circuit coupled to the system memory, the memory access operation circuit including a first circular buffer and a second circular buffer, and
a data processor circuit coupled to the at least one neural engine circuit and the memory access operation circuit, the data processor circuit including a flow control circuit configured to generate a first plurality of addressing parameters that defines wrapping of data in the first circular buffer,
wherein the first circular buffer is configured to control data flow between the neural processor circuit and the system memory by storing first data associated with the system memory in the first circular buffer so that the first data is wrapped around in the first circular buffer, and an addressing layout of the first data wrapped around in the first circular buffer is defined by the first plurality of addressing parameters,
wherein the flow control circuit is further configured to generate a second plurality of addressing parameters that defines wrapping of data in the second circular buffer, and
the second circular buffer is configured to control data flow between the neural processor circuit and the system memory by storing second data associated with the system memory so that the second data is wrapped around in the second circular buffer, an addressing layout of the second data wrapped around in the second circular buffer defined by the second plurality of addressing parameters.

19. The electronic device of claim 18, further comprising a planar engine circuit coupled to the data processor circuit, the planar engine circuit configured to perform at least operations on a channel basis, and wherein:
the flow control circuit is further configured to update the first plurality of addressing parameters; and
the first circular buffer is further configured to control data flow between the at least one neural engine circuit and the planar engine circuit by storing third data associated with the planar engine circuit in the circular buffer so that the third data is wrapped around in the first circular buffer, an addressing layout of the third data wrapped around in the first circular buffer defined by the first plurality of updated addressing parameters.

20. The electronic device of claim 18, wherein the first and second pluralities of addressing parameters each comprise:
a first addressing parameter that determines a start address in the first circular buffer for storing the first data; and
a second addressing parameter that determines an end address of a first segment of the first data in the first circular buffer and a start address of a second segment of the first data in the first circular buffer, the second segment following the first segment within the first data, the second segment preceding the first segment within the first circular buffer.

* * * * *

UNITED STATES PATENT AND TRADEMARK OFFICE
CERTIFICATE OF CORRECTION

| | |
|---|---|
| PATENT NO. | : 12,468,926 B2 |
| APPLICATION NO. | : 17/344900 |
| DATED | : November 11, 2025 |
| INVENTOR(S) | : Mills |

Page 1 of 1

It is certified that error appears in the above-identified patent and that said Letters Patent is hereby corrected as shown below:

In the Claims

In Column 29, Claim 15, Line 31, delete "on channel" and insert -- on a channel --, therefor.

Signed and Sealed this
Twenty-third Day of December, 2025

John A. Squires
*Director of the United States Patent and Trademark Office*